United States Patent
Nicholson et al.

(10) Patent No.: US 8,799,360 B2
(45) Date of Patent: Aug. 5, 2014

(54) SYSTEMS, METHODS AND ARTICLES FOR A SERVER PROVIDING COMMUNICATIONS AND SERVICES INVOLVING AUTOMOBILE HEAD UNITS

(71) Applicant: Tweddle Group, Inc., Clinton Township, MI (US)

(72) Inventors: Jonas Kolba Nicholson, Preston, WA (US); Abbas Ali Vanak, Bellevue, WA (US); Paul John Henry Klassen, Newcastle, WA (US); Jason Holt Smith, Kent, WA (US); Troy Terry, Bellevue, WA (US); Alexander Kinlin, Seattle, WA (US); Ronald Otto Radko, Kirkland, WA (US); Erik Andrew Clauson, Bellevue, WA (US); Jason David Justman, Bellevue, WA (US); Mark William Wigzell, Kirkland, WA (US); George Cecil Trowbridge, Jr., Carnation, WA (US); Xiaobin Lu, Bellevue, WA (US); Tomasz J. Gil, Seattle, WA (US); Nilesh Rane, Bellevue, WA (US); Ryan B. Starkey, Issaquah, WA (US)

(73) Assignee: Tweddle Group, Inc., Clinton Township, MI (US)

( * ) Notice: Subject to any disclaimer, the term of this patent is extended or adjusted under 35 U.S.C. 154(b) by 0 days.

(21) Appl. No.: 13/756,436

(22) Filed: Jan. 31, 2013

(65) Prior Publication Data
US 2014/0068010 A1 Mar. 6, 2014

Related U.S. Application Data

(63) Continuation of application No. PCT/US2012/053558, filed on Aug. 31, 2012.

(51) Int. Cl.
*H04L 29/08* (2006.01)
*B60K 35/00* (2006.01)
*B60R 16/023* (2006.01)

(52) U.S. Cl.
CPC ............... *H04L 67/12* (2013.01); *B60K 35/00* (2013.01); *B60R 16/0234* (2013.01)
USPC ............... 709/203; 709/217; 709/223; 701/1; 701/36

(58) Field of Classification Search
CPC ........ H04L 29/08; H04L 67/12; B60K 35/00; B40R 16/0234
USPC ......................... 709/203, 223, 217; 701/1, 36
See application file for complete search history.

(56) References Cited

U.S. PATENT DOCUMENTS 6,157,953 A 12/2000 Chang et al.
7,093,017 B1 8/2006 Olgaard et al.
(Continued)

OTHER PUBLICATIONS

"Internet protocol suite," Wikipedia, retrieved from URL=http://en.wikipedia.org/wiki/TCP?IP_model on Apr. 12, 2013, 14 pages.

(Continued)

*Primary Examiner* — Alina N Boutah
(74) *Attorney, Agent, or Firm* — Seed IP Law Group, PLLC

(57) ABSTRACT

Network communications, Web-based services and customized services using the Web-based services may be provided to drivers and users via the automobile head unit in the vehicle and via their mobile device. The automobile head unit in the vehicle and the mobile device are communicatively linked via a short range wireless connection. Also, these devices may communicate over a network such as a cellular network to a service provider that provides entertainment and informational services to the mobile device and the head unit of the vehicle. The user's profile and preferences are able to follow the user to various locations and into vehicles because this information is stored at a server accessible by the user's mobile device, and in some embodiments, also the head unit. The mobile device may provide services to the head unit if it does not have wider network connectivity over the short range wireless connection.

25 Claims, 17 Drawing Sheets

(56) References Cited

U.S. PATENT DOCUMENTS

| | | | |
|---|---|---|---|
| 7,209,816 B2 | 4/2007 | Mueller | |
| 7,962,470 B2 | 6/2011 | Degenkolb et al. | |
| 8,131,456 B2* | 3/2012 | Mahalingaiah et al. | 701/117 |
| 8,412,406 B2* | 4/2013 | Johnson et al. | 701/33.1 |
| 2003/0139179 A1 | 7/2003 | Fuchs et al. | |
| 2004/0054443 A1* | 3/2004 | Hall et al. | 701/1 |
| 2005/0027438 A1* | 2/2005 | Rockett et al. | 701/200 |
| 2005/0176482 A1* | 8/2005 | Raisinghani et al. | 455/575.9 |
| 2006/0003803 A1 | 1/2006 | Thomas et al. | |
| 2006/0122748 A1 | 6/2006 | Nou | |
| 2006/0166631 A1 | 7/2006 | Ross et al. | |
| 2007/0005206 A1* | 1/2007 | Zhang et al. | 701/36 |
| 2007/0094276 A1 | 4/2007 | Isaac | |
| 2007/0094366 A1* | 4/2007 | Ayoub | 709/223 |
| 2007/0136163 A1* | 6/2007 | Bell | 705/35 |
| 2008/0032721 A1 | 2/2008 | MacDonald et al. | |
| 2009/0012675 A1 | 1/2009 | Laghrari et al. | |
| 2009/0024359 A1 | 1/2009 | Bibelhausen et al. | |
| 2009/0195370 A1 | 8/2009 | Huffman et al. | |
| 2009/0265633 A1 | 10/2009 | Lim et al. | |
| 2010/0057781 A1* | 3/2010 | Stohr | 707/104.1 |
| 2010/0070107 A1* | 3/2010 | Berkobin et al. | 701/1 |
| 2010/0131642 A1 | 5/2010 | Chalikouras et al. | |
| 2010/0222939 A1* | 9/2010 | Namburu et al. | 701/2 |
| 2010/0234071 A1* | 9/2010 | Shabtay et al. | 455/562.1 |
| 2010/0313132 A1* | 12/2010 | Link, II | 715/727 |
| 2011/0093846 A1* | 4/2011 | Moinzadeh et al. | 717/178 |
| 2011/0143669 A1 | 6/2011 | Farrell et al. | |
| 2011/0187547 A1* | 8/2011 | Kweon | 340/670 |
| 2011/0271183 A1* | 11/2011 | Bose et al. | 715/702 |
| 2011/0289186 A1* | 11/2011 | Bell et al. | 709/217 |
| 2011/0295724 A1* | 12/2011 | Hill | 705/28 |
| 2012/0198080 A1* | 8/2012 | Yang et al. | 709/227 |
| 2012/0203625 A1 | 8/2012 | Soloff | |
| 2012/0259947 A1* | 10/2012 | Park | 709/217 |
| 2012/0270560 A1 | 10/2012 | Moshir et al. | |
| 2012/0324046 A1* | 12/2012 | Park | 709/217 |
| 2013/0045678 A1* | 2/2013 | Lee | 455/39 |
| 2013/0086518 A1* | 4/2013 | Park et al. | 715/808 |
| 2013/0101125 A1 | 4/2013 | Peters et al. | |
| 2013/0179029 A1* | 7/2013 | Wang et al. | 701/32.7 |
| 2013/0196638 A1* | 8/2013 | Kim et al. | 455/414.1 |

OTHER PUBLICATIONS

"OSI model," Wikipedia, retrieved from URL=http://en.wikipedia.org/wiki/Osi_reference_model on Apr. 12, 2013, 13 pages.

Braden (ed.), "Requirements for Internet Hosts—Communication Layers," Request for Comments: 1122, Internet Engineering Task Force, Oct. 1989, 116 pages.

Braden (ed.), "Requirements for Internet Hosts—Application and Support," Request for Comments: 1123, Internet Engineering Task Force, Oct. 1989, 98 pages.

Nicholson et al., "Systems, Methods and Articles for a Communications Device Providing Communications and Services Involving Automobile Head Units," U.S. Appl. No. 13/756,430, filed Jan. 31, 2013, 121 pages.

Nicholson et al., "Systems, Methods and Articles for Providing Communications and Services Involving Automobile Head Units and User Preferences," U.S. Appl. No. 13/756,425, filed Jan. 31, 2013, 118 pages.

International Search Report and Written Opinion for International Patent Application No. PCT/US2012/053558, mailed Mar. 25, 2013, 14 pages.

Bell et al., "Systems, Methods and Articles for Providing Communications and Services Via a Peer-To-Peer Network Over a Data Transport Link," Office Action, for U.S. Appl. No. 13/114,830, mailed May 20, 2013, 37 pages.

Nicholson et al., "Systems, Methods and Articles for a Communications Device Providing Communications and Services Involving Automobile Head Units," Notice of Allowance, for U.S. Appl. No. 13/756,430, mailed Jun. 27, 2013, 11 pages.

Nicholson et al., "Systems, Methods and Articles for Providing Communications and Services Involving Automobile Head Units and User Preferences," Office Action for U.S. Appl. No. 13/756,425, mailed Jun. 18, 2013, 16 pages.

Bell et al., "Systems, Methods and Articles for Providing Communications and Services Via a Peer-To-Peer Network Over a Data Transport Link," Office Action mailed Nov. 7, 2013, for U.S. Appl. No. 13/114,830, 46 pages.

Nicholson et al., "Systems, Methods and Articles for Providing Communications and Services Involving Automobile Head Units and User Preferences," Office Action mailed Oct. 7, 2013, for U.S. Appl. No. 13/756,425, 14 pages.

"Web Services Glossary," *W3C Working Group Note*, Feb. 11, 2004, retrieved from URL=http://www.w3.org/TR/2004/NOTE-ws-gloss-20040211/, on Jan. 28, 2014, 19 pages.

Bell et al., "Systems, Methods and Articles for Providing Communications and Services Via a Peer-To-Peer Network Over a Data Transport Link," Office Action mailed May 15, 2014, for Usan 13/114,830, 24 pp.

* cited by examiner

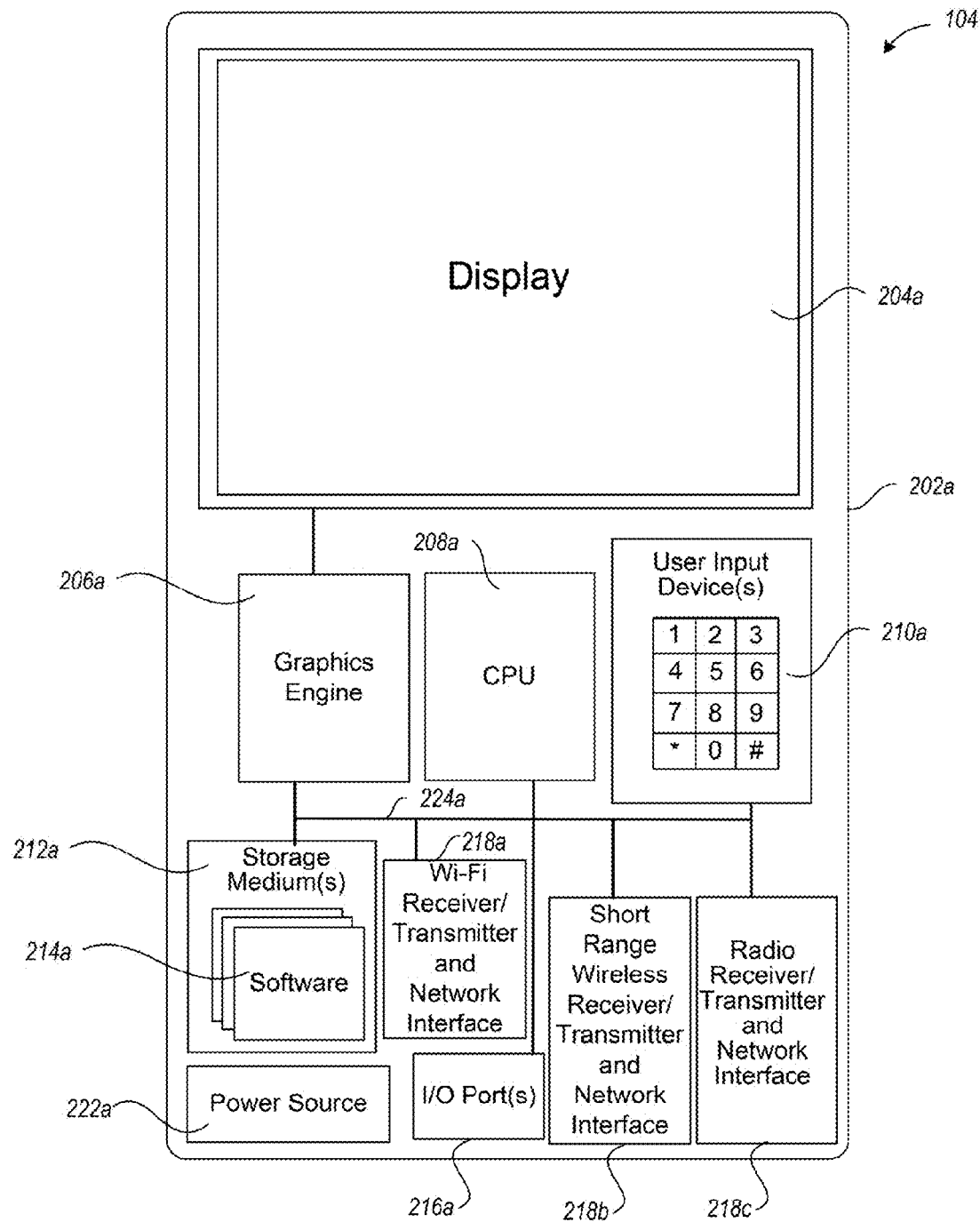
Fig. 2A      Handheld Device

SYSTEMS, METHODS AND ARTICLES FOR A SERVER PROVIDING COMMUNICATIONS AND SERVICES INVOLVING AUTOMOBILE HEAD UNITS

BACKGROUND

1. Technical Field

This disclosure relates to providing communications and services to a device (e.g., vehicle head unit).

2. Description of the Related Art

As information services increasingly become Web-based, continuous or near continuous access to the Internet for communications and data processing devices becomes more important for end users and businesses to be able to access these services in a timely and useful manner.

This is becoming especially prevalent in the automobile industry where the driver desires to have a seamless entertainment experience while driving any car and have current and relevant information readily available to them anywhere and anytime.

Thus, an improved approach that provides connectivity and customized services to devices used in automobiles, which may not otherwise have connectivity to a more general server-based network such as the Internet is desirable.

BRIEF SUMMARY

A method for electronically providing services to an automobile head unit may be summarized as including receiving, by a computer processor of a server, a request from a remote device of an authenticated user; identifying, by the computer processor of the server, a remote automobile head unit associated with the request; and in response to the request, electronically providing by the computer processor of the server, services or information to the identified remote automobile head unit based on one or more of: the request, the authenticated user, another authenticated user and the remote device, to cause the identified remote automobile head unit to operate according to corresponding preferences of identified user preferences of the authenticated user or of identified user preferences of the other authenticated user.

The authenticated user may be associated with the remote device and the remote automobile head unit may be associated with the other authenticated user. The remote device may be one of: the automobile head unit, a mobile device and a computer. The remote device may be an automobile head unit, the server may be operating on a mobile device and the corresponding preferences of the identified user may be associated with the mobile device.

The method for electronically providing services to an automobile head unit may further include storing on the mobile device, by the computer processor of the server, the identified user preferences of the authenticated user, to enable the mobile device to cause one or more other identified remote automobile head units to operate according to the identified user preferences of the authenticated user.

The method for electronically providing services to an automobile head unit may further include electronically providing, by the computer processor of the server, the services or information to another identified remote automobile head unit to cause the other identified remote automobile head unit to operate according to the identified user preferences of the authenticated user.

The information provided may include the identified user preferences. The remote device may be a mobile device located geographically remote from the identified remote automobile head unit. The remote device may be a mobile device and the receiving the request from the remote device may include receiving the request from the mobile device which had received the request from the identified remote automobile head unit. The electronically providing the services or information via the server to the identified remote automobile head unit may include electronically providing data to a mobile device of the user enabling the mobile device to provide the services or information to the identified remote automobile head unit. The electronically providing the services or information to the identified remote automobile head unit may include electronically providing the services or information to the identified remote automobile head unit via a wireless telecommunications receiver of the identified remote automobile head unit. Electronically providing the services or information to the identified remote automobile head unit via the wireless telecommunications receiver of the identified remote automobile head unit may include providing the services or information to the identified remote automobile head unit by the server using a cellular service to communicate data to provide the services or information to the identified remote automobile head unit. The electronically providing the services or information via the server to the identified remote automobile head unit may include providing one or more of: services or information according to a profile, identified preferences or previous selections of the authenticated user or other authenticated user; services or information to remotely control or configure the vehicle by the authenticated user; services or information to remotely and automatically configure settings of the vehicle according to a profile, identified preferences or previous selections of the authenticated user; services or information to remotely and automatically access and provide third party subscription services of the authenticated user via the identified remote automobile head unit; services or information to cause the identified remote automobile head unit to automatically play or display music related information, identified music preferences or particular music selections according to a profile, identified preferences or previous selections of the authenticated user; services or information to cause the identified remote automobile head unit to display or automatically play sports related information, identified preferences or previous selections according to a profile, identified preferences or previous selections of the authenticated user; services or information to cause the identified remote automobile head unit to display or automatically play weather related information, identified preferences or previous selections according to a profile, identified preferences or previous selections of the authenticated user; services or information to cause the identified remote automobile head unit to display or automatically play news related information, identified preferences or previous selections according to a profile, identified preferences or previous selections of the authenticated user; services or information to cause the identified remote automobile head unit to automatically play or display Internet search engine related information according to a profile, identified preferences or previous selections of the authenticated user; services or information to cause the identified remote automobile head unit to provide Web browser functionality to the authenticated user; services or information to remotely configure user interface settings or identified preferences of the identified remote automobile head unit according to according to a profile, previous selections or identified preferences of the authenticated user; services or information to cause the identified remote automobile head unit to automatically display a customized user interface according to a profile, previous selections or identified preferences of the authenticated user; services or information to cause the identified remote automobile head unit to automatically configure navigation system settings according to a profile, previous selections or identified preferences of the authenticated user; services or information related to geographical locations or points of interest of the authenticated user enabling the automobile head unit to use the geographical locations or points of interest in conjunction with a navigation system; services or information to enable a pairing between the identified remote automobile head unit and the remote device of the authenticated user based on the identifying the remote automobile head unit associated with the request; services or information to facilitate transfer of information between the remote device and the identified remote automobile head unit.

An article of manufacture may be summarized as including a non-transitory computer processor-readable storage medium having computer processor-executable instructions stored thereon that, when executed, cause the computer processor to receive a request from a remote device; identify a remote automobile head unit associated with the request; and in response to the request, cause the identified remote automobile head unit to operate according to user preferences of a user by at least identifying to the remote device the user preferences of the user.

The computer processor-executable instructions, when executed, may further cause the computer processor to authenticate the user before causing the identified remote automobile head unit to operate according to user preferences. The remote device may be one of the automobile head unit, a mobile device and a computer. The remote device may be an automobile head unit, wherein the user preferences of the user may be associated with a mobile device and wherein the identifying to the remote device the user preferences of the user may include communicating the user preferences of the user from the mobile device to the remote device. The computer processor-executable instructions, when executed, may further cause the computer processor to enable the mobile device to cause one or more other identified remote automobile head units to operate according to the user preferences of the authenticated user by storing on the mobile device the user preferences of the user. The remote device may be the identified automobile head unit and the identifying to the remote device the user preferences of the user may include communicating the user preferences from a mobile device to the identified automobile head unit. The remote device may be the identified automobile head unit and the causing the identified remote automobile head unit to operate according to user preferences may further include communicating a background image from a server or a mobile device to the identified automobile head unit. The remote device may be a mobile device located geographically remote from the identified remote automobile head unit. The remote device may be the identified automobile head unit and the identifying to the remote device the user preferences of the user may include communicating the user preferences from an authorized mobile device or from a server to the identified automobile head unit.

An automobile head unit system may be summarized as including a computer processor; and at least one non-transitory computer processor-readable storage medium coupled to the computer processor, the storage medium having processor-executable instructions stored thereon that, when executed, cause the computer processor to receive a request from a mobile device; authenticate the request; in response to authenticating the request, accept services or information from the mobile device; and in response to the accepted services or information, automatically configure the automobile head unit according to identified user preferences of a user associated with the request based on one or more of: the accepted services or information from the mobile device, and services or information associated with the user associated with the request, wherein the services or information associated with the user associated with the request is from a remote server.

The accepted information from the mobile device may include the identified user preferences. The accepted information associated with the user associated with the request may include the identified user preferences. The mobile device may be located geographically remote from the automobile head unit system. The mobile device may be located within a range of short range wireless communication between the automobile head unit system and the mobile device.

An article of manufacture may be summarized as including a non-transitory computer processor-readable storage medium having processor-executable instructions stored thereon that, when executed, cause the computer processor to send a request associated with a user and a remote automobile head unit; in response to the sent request, receive indications of user preferences of the user; and cause the remote automobile head unit to operate according to the user preferences of a user based on the received indications of user preferences of the user.

The processor-executable instructions, when executed, may further cause the computer processor to authenticate the user before the sending the request associated with the user and the remote automobile head unit. The sending the request associated with the user and the remote automobile head unit may include sending the request to a remote server or wirelessly to a mobile device via a short range wireless signal.

A computer-implemented method of providing communications between a head unit of an automobile and a communications device having a handheld form factor may be summarized as including facilitating, by the processor of the communications device, establishment of a communications link that communicatively couples the head unit and the communications device based on an authentication or a verification of authorization involving one or more of the head unit, a vehicle identifier of the automobile, the communications device, a user account and user credentials; receiving, by the processor of the communications device, information from the head unit; and electronically providing, by the processor of the communications device, a service based on the information received from the head unit and user-specific preference or user identification information stored on the communications device.

The providing the service based on the information received from the head unit and the user-specific preference or user identification information stored on the communications device may include receiving, by the processor of the communications device, while the communications link that communicatively couples the head unit and the communications device is still established, access control information from a remote server via a different communications link that is indicative of whether the service is authorized to be used by the head unit and having a value based on the information received from the head unit and the user-specific preference or user identification information; determining, by the processor of the communications device, whether the service is authorized to be used by the head unit based on the access control information received from the remote server; and if it is determined that the service is authorized to be used by the head unit based on the access control information received from the remote server, then electronically providing, by the processor of the communications device, the service to the head unit via the communications device. The information received from the head unit may include a request for the service and the determining whether the particular service is authorized to be used by the head unit based on the access control information may include determining, by the processor of the communications device, in response to receiving the request for the service from the head unit, whether the service is authorized to be used by the head unit.

The computer-implemented method of providing communications between a head unit of an automobile and a communications device having a handheld form factor may further include receiving, by the processor of the communications device, a plurality of requests from the head unit; and filtering out at least one request from the plurality of requests, by the processor of the communications device, that is for a service the head unit is not authorized to receive, based on the access control information received from the remote server; and denying the head unit, by the processor of the communications device, the filtered-out at least one request.

The computer-implemented method of providing communications between a head unit of an automobile and a communications device having a handheld form factor may further include sending, by the processor of the communications device, a response message to the filtered-out at least one request, the response message configured to be seen or heard by a user as output from the head unit and indicative of a reason why the head unit is not authorized to receive a service requested by the filtered out at least one request.

The computer-implemented method of providing communications between a head unit of an automobile and a communications device having a handheld form factor may further include determining, by the processor of the communications device, that the reason why the head unit is not authorized to receive the service requested by the filtered out at least one request is that the service requested by the filtered out at least one request is not included in a level of service of an account associated with the user identification information stored on the communications device.

The communications device may be a wireless mobile device, the communications link may be a wireless link and the receiving the information from the head unit may include wirelessly receiving, by the processor of the communications device, the information from the head unit. The information received from the head unit may include a request for information available on the Internet as indicated by a particular uniform resource locator (URL) and the providing the service based on the information received from the head unit and the user-specific preference or user identification information stored on the communications device may include determining, by the processor of the communications device, whether access to the URL is authorized by the head unit; and if it is determined that the access to the URL is authorized for the head unit, then electronically providing, by the processor of the communications device, the service to the head unit via the communications device, wherein the service may include providing access to the head unit of the uniform resource locator (URL) for the information available on the Internet. The information received from the head unit may include a request for a particular data type and the providing the service based on the information received from the head unit and the user-specific preference or user identification information stored on the communications device may include determining, by the processor of the communications device, whether access to the particular data type is authorized by the head unit; and if it is determined that the access to the particular data type is authorized for the head unit, then electronically providing, by the processor of the communications device, the service to the head unit via the communications device, wherein the service may include providing access to the particular data type. The determining whether access to the particular data type is authorized by the head unit may include receiving information from a remote server, by the processor of the communications device, on which the determining of whether access to the particular data type is authorized may be at least partially based and that changes based on one or more of: a subscription level of an account associated with the user account or the user identification information, characteristics of the head unit and characteristics of the communications device. The providing the service based on the information received from the head unit and the user-specific preference or user identification information stored on the communications device may include providing, by the processor of the communications device, while the communications link that communicatively couples the head unit and the communications device is still established, customized error messages to the head unit in response to particular requests for services included in the information received from the head unit being for a services that are not able to be provided, wherein the customized error messages may indicate one or more reasons for the customized error messages that may include one or more of: lack of capabilities, functionalities or compatibility of the head unit, insufficient status or subscription level of the user account as identified by the user credentials, lack of capabilities, functionalities or compatibility of the communications device, settings included in the user-specific preference information, and a media device being used by the head unit. The providing the service based on the information received from the head unit and the user-specific preference or user identification information stored on the communications device may include sending or receiving, by the processor of the communications device, data in a compressed format to or from the remote server in providing the service in response to at least one request for the service included in the information received from the head unit.

The computer-implemented method of providing communications between a head unit of an automobile and a communications device having a handheld form factor may further include receiving, by the processor of the communications device, information from one or more additional head units, and wherein the electronically providing, by the processor of the communications device, the service based on the information received from the head unit and user-specific preference or user identification information stored on the communications device may include electronically providing, by the processor of the communications device, a service based on the information received from the head unit and the information received from the one or more additional head units regarding one or more of a location of the head unit, one or more locations of the one or more additional head units, selectively sending information to the head unit, selectively sending information to the one or more additional head units; and wherein communications links between the communications device and the one or more additional head units and the communications link that communicatively couples the head unit and the communications device may be secure communication channels.

A computer-implemented method of providing a head unit of an automobile access to services and information from remote devices may be summarized as including receiving, by a processor of a wireless mobile device, multiple service requests from the head unit, wherein the wireless mobile device and head unit are communicating on a short range wireless communications link; evaluating, by the processor of the wireless mobile device, each of the multiple received service requests, to determine, for each of the multiple received service requests, how to process the received service request according to a particular service that is being requested by the received service request and based on one or more of: a user account associated with the service request, the head unit, a vehicle identifier of the automobile, the wireless mobile device, a user account, user credentials, and user-specific preference or user identification information; and processing, by the processor of the wireless mobile device, the multiple received service requests according to the evaluation.

The processing the multiple received service requests according to the evaluation may include sending, by the processor of the mobile device, a request of the multiple received service requests and some of the user-specific preference or user identification information to a remote server; receiving, by the processor of the mobile device, a response from the remote server customized according to the user-specific preference or user identification information; and sending the response to the head unit. The processing the multiple received service requests according to the evaluation may include injecting, by the processor of the communications device, the user credentials into at least one of the multiple service requests received from the head unit to avoid saving the credentials on the head unit; sending, by the processor of the mobile device, the request, into which the user credentials were injected, to a remote server that requires the user credentials for specific information; receiving a response from the remote server including the specific information; and sending the response to the head unit including the specific information.

The computer-implemented method of providing a head unit of an automobile access to services and information from remote devices may further include storing, by the processor of the mobile device, statistical information regarding how many multiple service requests were received from the head unit.

The computer-implemented method of providing a head unit of an automobile access to services and information from remote devices may further include storing, by the processor of the mobile device, the statistical information to provide one or more of the following: data regarding customer behavior, data regarding denial of service attacks, data regarding misuse of service and improvement of customer service.

The receiving multiple service requests from the head unit may include receiving multiple service requests for multiple concurrent connections to a remote server, and the processing the multiple received service requests may include establishing the multiple concurrent connections to the remote server.

A wireless mobile communications device may be summarized as including a computer processor; and at least one non-transitory computer processor-readable storage medium coupled to the computer processor, the storage medium having processor-executable instructions stored thereon that, when executed, cause the computer processor to receive a request from a head unit of an automobile using network file system protocols to access files of the wireless mobile communications device; evaluate the request from the head unit of the automobile, to determine how to process the received service request according to a particular service that is being requested by the received request and based on one or more of: a user account associated with the request, the head unit, a vehicle identifier of the automobile, a user account, user credentials, and user-specific preference or user identification information; and send a response to the request providing the requested access to the file system according to the evaluation.

The processor-executable instructions stored thereon, when executed, may cause the computer processor to receive multiple service requests from the head unit; and redirect many of the received multiple service requests. The processor-executable instructions stored thereon, when executed, may cause the computer processor to receive multiple communication requests from various other automobile head units; and provide a communication channel to remote devices to each of the various other automobile head units via the wireless mobile communications device.

The wireless mobile communications device may further include a non-transitory storage device coupled to the processor configured to cache and store data for users and head units of the users' automobiles.

An article of manufacture may be summarized as including a non-transitory computer processor-readable storage medium having computer processor-executable instructions stored thereon that, when executed, cause a computer processor of a wireless mobile device to: receive multiple service requests from a head unit of an automobile for streaming media, wherein the wireless mobile device and the head unit are communicating over a short range wireless communications link; evaluate each of the multiple received service requests, to determine, for each of the multiple received service requests how to process the received service request based on a capability and functionality of the head unit to decode and play the streaming media; based on the evaluation, select an option to stream and decode the requested streaming media using the processor if a capability and functionality of the head unit to play the streaming media falls below a particular level, and to stream the requested streaming media for the head unit to decode and play if the capability and functionality of the head unit to play the streaming media does not fall below the particular level; and based on the evaluation, select an option to stream and decode the requested streaming media by streaming the requested streaming media from the if the capability and functionality of the head unit to play the streaming media falls below a determined level.

The processor-executable instructions, when executed, may further cause the computer processor to receive a request from the head unit over Transmission Control Protocol (TCP) to route socket network traffic; and authenticate and route the socket network traffic in response to the particular service that is being requested by the received service request and based on one or more of: a user account associated with the service request, the head unit, a vehicle identifier of the automobile, the wireless mobile device, a user account, user credentials, and user-specific preference or user identification information; and processing, by the processor of the wireless mobile device, the multiple received service requests according to the evaluation.

The processor-executable instructions, when executed, may further cause the computer processor to: upon detection that the wireless mobile device and head unit are communicating over the short range wireless communications link, disable usage of selected particular applications of the mobile wireless device that had been previously selected as unsafe to use while driving. The processor-executable instructions, when executed, may further cause the computer processor to: upon detection that the wireless mobile device and head unit are compatible, force an update of the mobile wireless device. The processor-executable instructions, when executed, may further cause the computer processor to: cause one central application on the wireless mobile device to communicate to other applications in working work together on the wireless mobile device in providing services to the head unit. The processor-executable instructions, when executed, may further cause the computer processor to: facilitate monitoring of bandwidth use for user of the wireless mobile device. The processor-executable instructions, when executed, may further cause the computer processor to: determine which mode of location should be used by the wireless mobile device based on an application's accuracy requirements that is running on the wireless mobile device and the environment the wireless mobile device is in during location acquisition of the mobile wireless device. The processor-executable instructions, when executed, may further cause the computer processor to: automatically change a configuration of software on the mobile wireless device to be directed to a specific test server based on a specific type of the wireless mobile device and a specific test run for test and automation of the wireless mobile device. The automatically changing the configuration of the software on the mobile wireless device for testing may occur without having to rebuild a code base of the software.

A computer-implemented method of providing services by a server to one or more remote head units of automobiles and one or more remote communications devices having a handheld form factor that are associated with the one or more head units may be summarized as including receiving, by at least one processor of the server, information regarding a head unit of an automobile; receiving, by the at least one processor of the server, information regarding a communications device associated with the head unit of the automobile; identifying, by the at least one processor of the server, one or more of the head unit and the communications device associated with the head unit based at least in part on the received information and other previously stored information regarding the head unit and communications device; and providing, by the at least one processor of the server, one or more services to one or more of the head unit and the associated communications device based on the identification of the one or more of the head unit and the communications device associated with the head unit.

The providing the one or more services to one or more of the head unit and the associated communications device based on the identification of the one or more of the head unit and the communications device associated with the head unit may include providing, by the at least one processor of the server, multimedia services for a user associated with the one or more of the head unit and the communications device that can roam with the user to other automobiles with a capability to support the multimedia services by authenticating, by the at least one processor of the server, the user via the one or more of the head unit and the communications device. The providing the one or more services to one or more of the head unit and the associated communications device based on the identification of the one or more of the head unit and the communications device associated with the head unit may include abstracting, by the at least one processor of the server, of user input to the one or more of the head unit and the communications device. The providing the one or more services to one or more of the head unit and the associated communications device based on the identification of the one or more of the head unit and the communications device associated with the head unit may include tracking or monitoring, by the at least one processor of the server, error classes associated with the one or more of the head unit and the associated communications device. The providing the one or more services to one or more of the head unit and the associated communications device based on the identification of the one or more of the head unit and the communications device associated with the head unit may include providing, by the at least one processor of the server, the one or more services to one or more of the head unit and the associated communications device based on a vehicle identification number (VIN) associated with the one or more of the head unit and the associated communications device. The providing the one or more services to the one or more of the head unit and the associated communications device based on the vehicle identification number (VIN) may not require the VIN to be associated with any user.

The method of providing services by a server to one or more remote head units of automobiles and one or more remote communications devices having a handheld form factor that are associated with the one or more head units may further include providing, by the at least one processor of the server, services to detect and mitigate abuse of the server.

The method of providing services by a server to one or more remote head units of automobiles and one or more remote communications devices having a handheld form factor that are associated with the one or more head units may further include providing, by the at least one processor of the server, a repository of information regarding devices that are interoperable.

The method of providing services by a server to one or more remote head units of automobiles and one or more remote communications devices having a handheld form factor that are associated with the one or more head units may further include providing, by the at least one processor of the server, a virtual device that having dynamic features to facilitate building a device compatibility matrix.

The providing the one or more services to one or more of the head unit and the associated communications device based on the identification of the one or more of the head unit and the communications device associated with the head unit may include providing, by the at least one processor of the server, software updates to the head unit. The providing the one or more services to one or more of the head unit and the associated communications device based on the identification of the one or more of the head unit and the communications device associated with the head unit may include manipulating, by the at least one processor of the server, content to be provided to the one or more of the head unit and the associated communications device to maintain compatibility of the one or more of the head unit and the associated communications device with the content. The providing the one or more services to one or more of the head unit and the associated communications device based on the identification of the one or more of the head unit and the communications device associated with the head unit may include transforming, by the at least one processor of the server, content to be provided to the one or more of the head unit and the communications device to a one or more formats based on one or more supported formats of the one or more of the head unit and the communications device. The providing the one or more services to one or more of the head unit and the associated communications device based on the identification of the one or more of the head unit and the communications device associated with the head unit may include searching, by the at least one processor of the server, for the one or more of the head unit and the communications device, based on one or more of location, direction and speed of the one or more of the head unit and the communications device; and providing, by the at least one processor of the server, location information based on the searching. The providing the one or more services to one or more of the head unit and the associated communications device based on the identification of the one or more of the head unit and the communications device associated with the head unit may include linking, by the at least one processor of the server, third party credentials to a user identity associated with the one or more of the head unit and the communications device. The providing the one or more services to one or more of the head unit and the associated communications device based on the identification of the one or more of the head unit and the communications device associated with the head unit may include receiving a request for service from the one or more of the head unit and the associated communications device to be provided by a third party service provider; responding to the request obtaining the service from the third party and facilitating providing the requested service to without supplying credentials of the third party service provider to the one or more of the head unit and the associated communications device or a user associated with the one or more of the head unit and the associated communications device.

A server for providing services to one or more remote head units of automobiles and one or more remote communications devices having a handheld form factor that are associated with the one or more head units may be summarized as including at least one processor; and a non-transitory computer readable medium coupled to the at least one processor having computer-executable instructions stored thereon that, when executed cause the at least one processor to: receive information regarding a head unit of an automobile; receive information regarding a communications device associated with the head unit of the automobile; identify one or more of the head unit and the communications device associated with the head unit based at least in part on the received information and other previously stored information regarding the head unit and communications device; and provide services to manage ownership information of the automobiles associated with the head units.

The computer-executable instructions, when executed, may further cause the at least one processor to provide location services regarding current location of the one or more of the head unit and the communications device associated with the head unit. The computer-executable instructions, when executed, may further cause the at least one processor to provide services regarding using barcode data for authentication. The computer-executable instructions, when executed, may further cause the at least one processor to provide services regarding management of and authentication of guest users associated with the one or more of the head unit and the communications device associated with the head unit. The computer-executable instructions, when executed, may further cause the at least one processor to track usage of services provided to users associated with the one or more remote head units of the automobiles.

An automobile head unit may be summarized as including a non-transitory computer readable medium; and a processor coupled to the non-transitory computer readable medium, the processor having computer executable instructions thereon that, when executed, cause the processor to provide a test automation framework for the head unit that resides on the head unit.

The computer executable instructions, when executed, may further cause the processor to receive instructions from a remote system to control a user interface of the head unit; and execute the instructions to control the user interface of the head unit. The computer executable instructions, when executed, may further cause the processor to send information to the remote system regarding results of the execution of the instructions to control the user interface of the head unit.

A non-transitory computer readable storage medium may be summarized as having computer executable instruction thereon, that when executed, cause at least one processor of a server to: receive information regarding a head unit of an automobile; receive information regarding a communications device associated with the head unit of the automobile; identify one or more of the head unit and the communications device associated with the head unit based at least in part on the received information and other previously stored information regarding the head unit and communications device; and provide services to the one or more of the head unit and the associated communications device based on the identification of the one or more of the head unit and the communications device associated with the head unit.

The providing the one or more services to one or more of the head unit and the associated communications device based on the identification of the one or more of the head unit and the communications device associated with the head unit may include providing multimedia services for a user associated with the one or more of the head unit and the communications device that can roam with the user to other automobiles with a capability to support the multimedia services by authenticating, by the at least one processor of the server, the user via the one or more of the head unit and the communications device. The providing the one or more services to one or more of the head unit and the associated communications device based on the identification of the one or more of the head unit and the communications device associated with the head unit may include abstracting of user input to the one or more of the head unit and the communications device. The providing the one or more services to one or more of the head unit and the associated communications device based on the identification of the one or more of the head unit and the communications device associated with the head unit may include tracking or monitoring, by the at least one processor of the server, error classes associated with the one or more of the head unit and the associated communications device. The providing the one or more services to one or more of the head unit and the associated communications device based on the identification of the one or more of the head unit and the communications device associated with the head unit may include providing the one or more services to one or more of the head unit and the associated communications device based on a vehicle identification number (VIN) associated with the one or more of the head unit and the associated communications device. The providing the one or more services to the one or more of the head unit and the associated communications device based on the vehicle identification number (VIN) does not require the VIN to be associated with any user. The method may further include providing, by the at least one processor of the server, services to detect and mitigate abuse of the server.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

FIG. 2A is a schematic view of the handheld communications device shown in more detail according to one illustrated embodiment, the handheld communications device having a housing, a display, a graphics engine, a central processing unit (CPU), user input device(s), one or more storage mediums having various software modules thereon that are executable by the CPU, input/output (I/O) port(s), network interface(s), wireless receiver(s) and transmitter(s), and a power source.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, databases, communications devices, and communications networks have not been shown or described in detail to avoid unnecessarily obscuring descriptions of the embodiments.

Unless the context requires otherwise, throughout the specification and claims which follow, the word "comprise" and variations thereof, such as "comprises" and "comprising", are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, meaning "and/or" unless the content clearly dictates otherwise.

The headings and Abstract of the Disclosure provided herein are for convenience only and do not interpret the scope or meaning of the embodiments.

Figure 1:
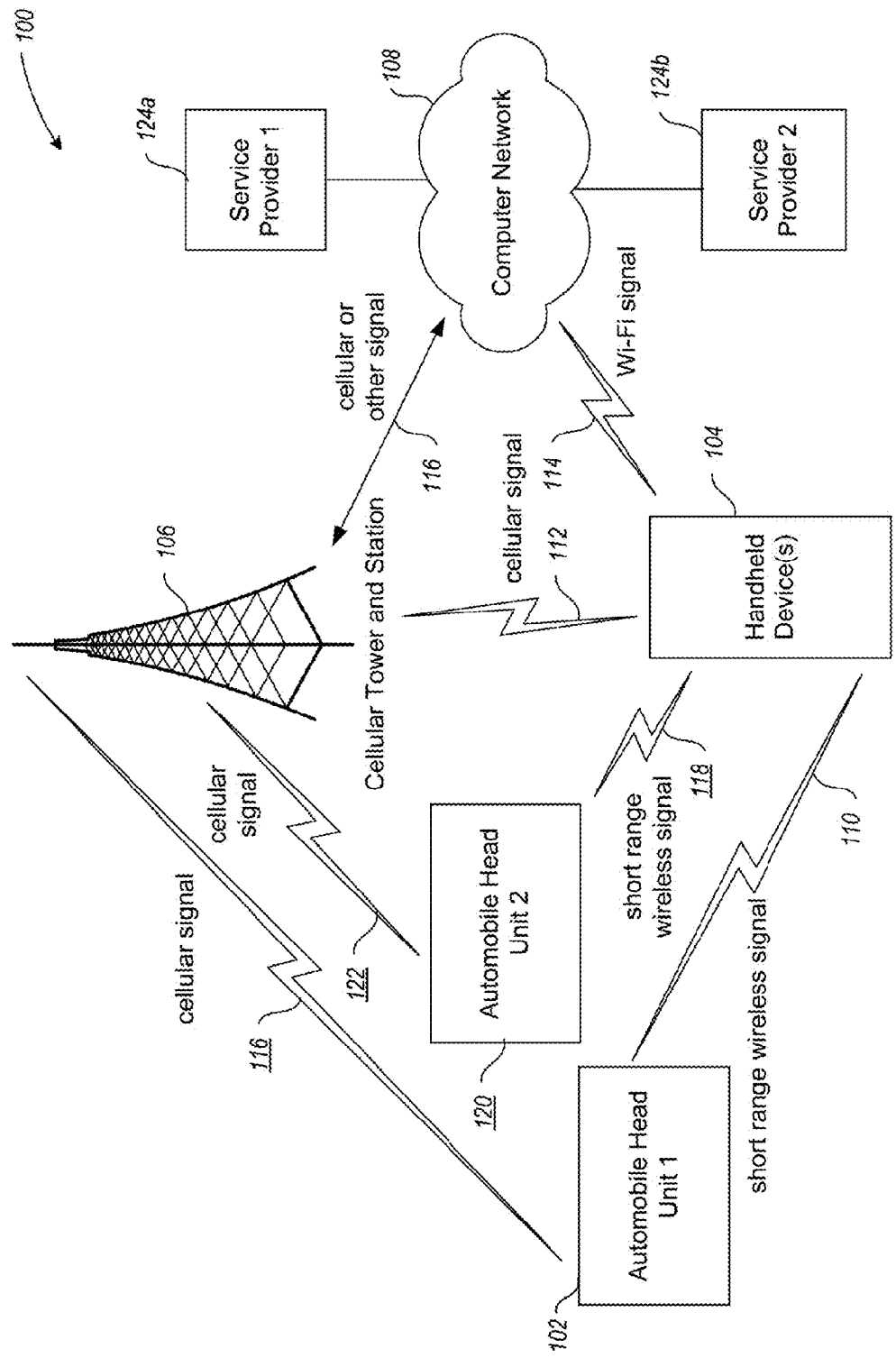
FIG. 1 is a system diagram of a networked environment according to one illustrated embodiment, the networked environment including an automobile head unit, a handheld communications device, a cellular tower and station, and a computer network, the automobile head unit and handheld communications device are communicatively linked by a short range wireless signal, the handheld communications device and cellular tower and station communicatively linked by a cellular signal, the handheld communications device and computer network optionally linked by one or more communications networks (e.g., using Wi-Fi signal), and the cellular tower and station and computer network communicatively linked by one or more communications networks (e.g., using a cellular or other signal).

FIG. 1 shows a networked environment 100 according to one illustrated embodiment. The networked environment may include an automobile head unit 102, a communications device having a handheld form factor (i.e., handheld communications device) 104, a cellular tower and station 106, and a computer network 108. The automobile head unit 102 may be any component of an automobile or vehicle configured to process or communicate information to a driver, passenger or other component of the automobile, or to control other components that process or communicate information to a driver, passenger or other component of the automobile. For example, the automobile head unit 102 may have computer processing, communications and data storage capabilities that are implemented by a combination of one or more embedded processing, memory and communications units or modules of the automobile head unit 102. Many automobile head units are typically a part of or control an automobile's in-dash stereo, navigation and/or other entertainment or driver information system.

The handheld communications device 104 can take the form of any of a large variety of mobile communications and/or processing devices having a handheld form factor. Examples of such may include cellular phones, personal digital assistants or PDAs (e.g., Blackberry® devices, iPhone® devices, Palm Pre® devices, Android® devices), cellular enabled laptop computers, netbook computers and tablet devices (e.g., IPAD® device).

The automobile head unit 102 and automobile head unit 120 may be communicatively linked by a short range wireless signal 100 and 118, respectively to handheld communications device 104. Note that automobile head unit 102 and automobile head unit 120 may be at different locations and in different vehicles and are not necessarily linked to the handheld device 104 at the same time. This short range wireless signal may be that of a wireless Bluetooth® link. However, other wireless or wired connections that support serial or parallel data transport may also be used. The link between the automobile head unit 102 and handheld communications device 104 may be automatically established when the handheld communications device 104 comes into the vicinity of the automobile head unit 102 according to various protocols and/or standards of the applicable type of short range wireless link. The connectivity over the short range wireless signal 110 may be enabled by the automobile head unit 102 and/or the handheld communications device 104 having the applicable hardware and software that provides the particular short-range wireless capability. For example, the automobile head unit 102 and handheld communications device 104 may both have wireless transmitters and receivers and, in the case of using a Bluetooth® wireless link, the corresponding executable Bluetooth® compatible network communications software that initiates, controls, maintains and manages the wireless link between the automobile head unit 102 and the handheld communications device 104 over the short range wireless signal 110.

The handheld communications device 104 and cellular tower and station 106 may be communicatively linked by a wireless cellular signal 112 supporting mobile telecommunications. For example, the mobile telecommunications may be various digital mobile telecommunications including those according to the International Mobile Telecommunications-2000 (IMT-2000), better known as the 3rd Generation (3G), family of standards for mobile telecommunications fulfilling specifications by the International Telecommunication Union. The handheld communications device 104 and computer network 108 may be optionally linked by one or more communication links or networks. For example, the communications network may be a local area network that uses wireless fidelity (Wi-Fi) high frequency radio signals 114 to transmit and receive data over distances of a few hundred feet. The local area network may be a wireless local area network (WLAN) based on the Institute of Electric and Electronic Engineers (IEEE) 802.11 standards. However, other wired and wireless communications networks and protocols may be used to link the handheld communications device 104 to the computer network 108. Thus, the handheld communications device 104 may have applicable wireless transmitters and receivers and, in the case of using a Wi-Fi wireless link, the corresponding executable Wi-Fi compatible network communications software that initiates, controls, maintains or manages the wireless link between the computer network 108 and the handheld communications device 104 over the Wi-Fi signal 114. The automobile head unit 102 and automobile head unit 120 and cellular tower and station 106 may also be communicatively linked by a wireless cellular signal 116 and 122 respectively, supporting mobile telecommunications. However, in other embodiments, as described herein, the automobile head unit 102 and automobile head unit 120 may not have such a connection to such server based networks.

The computer network 108 may comprise other computing entities that provide services to the handheld communications device 104 (i.e., a server-based network), and may itself represent multiple interconnected networks. For instance wired and wireless enterprise-wide computer networks, intranets, extranets, and/or the Internet may be included in or comprise a part of computer network 108. Other embodiments may include other types of communication networks including other telecommunications networks, cellular networks, paging networks, and other mobile networks. There may be any variety of computers, switching devices, routers, bridges, firewalls, edge devices and other devices within computer network 108 and/or in the communications paths between the handheld communications device 104, the cellular tower and station 106 and the computer network 108. In accordance with an aspect of the disclosure, the handheld communications device 104 may contain discrete functional program modules that might make use of an application programming interface (API), or other object, software, firmware and/or hardware, to request services of one or more of the other entities within the computer network 108. Although the physical environment of the computer network 108 may have connected devices such as computers, the physical environment may alternatively have or be described comprising various digital devices such as personal digital assistants (PDAs), televisions, MP3 players, etc., software objects such as interfaces, Component Object Model (COM) objects and the like.

There are a variety of systems, components, and network configurations that may also support distributed computing environments within the computer network 108. For example, computing systems may be connected to the together within the computer network 108 by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with, be connected to, or comprise part of the computer network 108.

The network infrastructure such as that shown FIG. 1 may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, executed by hardware that requests a service provided by another program. Generally, the client process utilizes the requested service without having to "know" any working details about the other program or the service itself. In a client/server architecture, particularly a networked system, a client is usually a computer or device that accesses shared network resources provided by another computer, e.g., a server. In the example of FIG. 2A, any entity including the automobile head unit 102, handheld communications device 104, cellular tower and station 106, and entities within computer network 108, can be considered a client, a server, or both, depending on the circumstances.

A server is typically, though not necessarily, a remote computer system accessible over a remote network, such as the Internet, or local network. The client process may be active in a first computer system or device, and the server process may be active in a second computer system or device, communicating with one another over a communications medium, thus providing distributed functionality and allowing single or multiple clients to take advantage of the information-gathering capabilities of the server. Any software objects may be distributed across multiple computing devices or objects. Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) which may be a component of a Universal Resource Locator (URL) can be used to identify the server or client computers to each other. Communication can be provided over a communications medium, e.g., client(s) and server(s) may be coupled to one another via transmission control protocol/internet protocol (TCP/IP) connection(s) for high-capacity communication. For example, the cellular tower and station 106 and computer network 108 may be communicatively linked by one or more communications networks or communication mediums (e.g., using a cellular or other wired or wireless signal 116) in order to send and receive information to and from the computer network 108 and receive and provide such information from and to the handheld communications device 104 over a wireless signal on the cellular network using applicable combinations and layers of telecommunications and networking protocols and standards such as 3G, HTTP and TCP/IP, etc.

For example, shown are service provider 1 124a and service provider 2 124b. These service providers may be entities or devices that communicate over the network 108 to provide data, media, management, entertainment, and other services to the handheld device 104 and/or the automobile head units 102 and 120. In some embodiments, service provider 1 124a responds to service requests from handheld device 104 and/or the automobile head units 102 and 120 over network 108 to provide services, programs, information and data regarding, music, sports, news, maps, locations of interest, navigation, etc. to users of handheld device 104 and/or the automobile head units 102 and 120. In fact, the automobile head units 102 and 120 may request such services via the handheld device 104 using the communication links 118 and 110. Also, the handheld device and service provider 1 124a and/or service provider 2 124b may store and communicate personal preference and other types of information to the automobile head units 102 and 120 (only two are shown, but any number of automobile head units may be used) regarding the user of the handheld device 104, such that the user of the handheld device has a customized personal experience whichever automobile he or she drives or rides in.

The handheld communications device 104 may have a housing 202a, a display 204a, a graphics engine 206a, a central processing unit (CPU) 208, one or more user input devices 210a, one or more storage mediums 212a having various software modules stored thereon comprising instructions that are executable by the CPU 208, input/output (I/O) port(s) 216a, a Wi-Fi receiver/transmitter and network interface 218b, a short range wireless receiver/transmitter and network interface 218aab, a cellular receiver/transmitter and network interface 218c, and a power source 222a.

As previously noted, the handheld communications device 104 may be any of a large variety of communications devices such as a cellular telephone, a portable media player (PMP), a personal digital assistant (PDA), a mobile communications device, portable computer with built-in or add-on cellular communications, a portable game console, a global positioning system (GPS), a handheld industrial electronic device, or the like, or any combination thereof. The handheld communications device 104 has at least one central processing unit (CPU) 206a which may be a scalar processor, a digital signal processor (DSP), a reduced instruction set (RISC) processor, or any other suitable processor. The central processing unit (CPU) 208, display 204a, graphics engine 206a, one or more user input devices 210a, one or more storage mediums 212a, input/output (I/O) port(s) 216a, Wi-Fi receiver/transmitter and network interface 218b, short range wireless receiver/transmitter and network interface 218aab, and cellular receiver/transmitter and network interface 218c may all be communicatively connected to each other via a system bus 224a. The system bus 224a can employ any suitable bus structures or architectures, including a memory bus with memory controller, a peripheral bus, and/or a local bus.

The handheld communications device 104 also includes one or more volatile and/or non-volatile storage medium(s) 212a. The storage mediums 212a may be comprised of any single or suitable combination of various types of processor-readable storage media and may store instructions and data acted on by CPU 208. For example, a particular collection of software instructions comprising software 214a and/or firmware instructions comprising firmware are executed by CPU 208. The software or firmware instructions generally control many of the operations of the handheld communications device 104 and a subset of the software and/or firmware instructions may perform functions to operatively configure hardware and other software in the handheld communications device 104 to provide the initiation, control and maintenance of applicable computer network and telecommunication links from the handheld communications device 104 to the external automobile head unit 102, cellular tower and station 106 and external computer network 108 as shown in FIG. 1 via the Wi-Fi receiver/transmitter and network interface 218b, short range wireless receiver/transmitter and network interface 218aab, cellular receiver/transmitter and network interface 218c, and/or I/O ports shown in FIG. 2A.

By way of example, and not limitation, the storage medium(s) 212a may be processor-readable storage media which may comprise any combination of computer storage media including volatile and nonvolatile, removable and non-removable media implemented in any method or technology for storage of information such as computer readable instructions, data structures, program modules or other data. Processor-readable storage media includes, but is not limited to, random access memory (RAM), read only memory (ROM), electrically erasable programmable read only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may accessed by CPU 208. Combinations of any of the above should also be included within the scope of processor-readable storage media.

The storage medium(s) 212a may include system memory which includes computer storage media in the form of volatile and/or nonvolatile memory such as read only memory (ROM) and random access memory (RAM). A basic input/output system (BIOS), containing the basic routines that help to transfer information between elements within handheld communications device 104, such as during start-up or power-on, is typically stored in ROM. RAM typically contains data and/or program modules that are immediately accessible to and/or presently being operated on by CPU 208. By way of example, and not limitation, FIG. 2A illustrates software modules 214a including an operating system, application programs and other program modules that implement the processes and methods described herein.

The handheld communications device 104 may also include other removable/non-removable, volatile/nonvolatile computer storage media drives. By way of example only, the storage medium(s) 212a may include a hard disk drive or solid state storage drive that reads from or writes to non-removable, nonvolatile media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in an operating environment of the handheld communications device 104 include, but are not limited to, flash memory cards, digital versatile disks, micro-discs, digital video tape, solid state RAM, solid state ROM, and the like. The storage medium(s) are typically connected to the system bus 224a through a non-removable memory interface. The storage medium(s) 212a discussed above and illustrated in FIG. 2A, provide storage of computer readable instructions, data structures, program modules and other data for the handheld communications device 104. In FIG. 2A, for example, a storage medium may store software 214a including an operating system, application programs, other program modules, and program data. The storage medium(s) 212a may implement a file system, a flat memory architecture, a database, or any other method or combination capable for storing such information.

A user may enter commands and information into the handheld communications device 104 through touch screen display 204a or the one or more input device(s) 210a such as a keypad, keyboard, camera, motion sensor, position sensor, light sensor, biometric data sensor, accelerometer, or a pointing device, commonly referred to as a mouse, trackball or touch pad. Other input devices of the handheld communications device 104 may include a microphone, joystick, game pad, optical scanner, other sensors, or the like. Example use of the input devices, in particular the microphone, is described in greater detail below in conjunction with communications to external servers. These and other input devices are often connected to the CPU 208 through a user input interface that is coupled to the system bus 224a, but may be connected by other interface and bus structures, such as a parallel port, serial port, wireless port, game port or a universal serial bus (USB). Generally, a unique software driver stored in software 214a configures each input mechanism to sense user input, and then the software driver provides data points that are acted on by CPU 208 under the direction of other software 214a. The display is also connected to the system bus 224a via an interface, such as the graphics engine 206a. In addition to the display 204a, the handheld communications device 104 may also include other peripheral output devices such as speakers, a printer, a projector, an external monitor, etc., which may be connected through one or more analog or digital I/O ports 216a or network interfaces of the Wi-Fi receiver/transmitter and network interface 218b, short range wireless receiver/transmitter and network interface 218aab or cellular receiver/transmitter and network interface 218c.

The handheld communications device 104 may operate in a networked environment using connections to one or more remote computers or devices, such as a remote computer or device within the computer network 108, the cellular tower and station 106, and the automobile head unit 102 shown in FIG. 1 and described above. The remote computer within computer network 108 may be a personal computer, a server, a router, a network PC, a peer device or other common network node, and typically includes many or all of the elements described above relative to the handheld communications device 104. Such connections to the computer network 108 may include local area network (LAN) connections as described above or wide area network (WAN) connections, and/or other networks.

When used in a LAN or WAN networking environment, the handheld communications device 104 may be connected via the Wi-Fi receiver/transmitter and network interface 218b and/or the cellular receiver/transmitter and network interface. When used in a WAN networking environment, the handheld communications device 104 may include a modem or other means as part of the network interface(s) for establishing communications over the WAN, such as the Internet. The Wi-Fi receiver/transmitter and network interface 218b and/or the cellular receiver/transmitter and network interface may be communicatively connected to the system bus 224a. In a networked environment, program modules depicted relative to the handheld communications device 104, or portions thereof, may be stored in a remote memory storage device of a remote system.

The handheld communications device 104 has a collection of I/O ports 216a and/or short range wireless receiver/transmitter and network interfaces 218b for passing data over short distances to and from the handheld communications device 104 or for coupling additional storage to the handheld communications device 104. For example, serial ports, USB ports, Wi-Fi ports, Bluetooth® ports, IEEE 1394 (i.e., FireWire), and the like can communicatively couple the handheld communications device 104 to other computing apparatuses. Compact Flash (CF) ports, Secure Digital (SD) ports, and the like can couple a memory device to the handheld communications device 104 for reading and writing by the CPU 208 or couple the handheld communications device 104 to other communications interfaces such as Wi-Fi or Bluetooth transmitters/receivers and/or network interfaces.

Handheld communications device 104 also has a power source 222a (e.g., a battery). The power source 222a may supply energy for all the components of the handheld communications device 104 that require power when a traditional, wired power source is unavailable or otherwise not connected. Other various suitable system architectures and designs of the handheld communications device 104 are contemplated and may be utilized which provide the same, similar or equivalent functionality as those described herein.

It should be understood that the various techniques described herein may be implemented in connection with hardware, software and/or firmware or, where appropriate, with a combination of such. Thus, the methods and apparatus of the disclosure, or certain aspects or portions thereof, may take the form of program code (i.e., instructions) embodied in tangible media, such as floppy diskettes, CD-ROMs, hard drives, or any other machine-readable or processor-readable storage medium wherein, when the program code is loaded into and executed by a machine, such as a processor of a computer or handheld communications device, the machine becomes an apparatus for practicing various embodiments. In the case of program code execution on programmable computers or handheld communications devices, such generally includes a processor, a storage medium readable by the processor (including volatile and non-volatile memory and/or storage elements), at least one input device, and at least one output device. One or more programs may implement or utilize the processes described in connection with the disclosure, e.g., through the use of an API, reusable controls, or the like. Such programs are preferably implemented in a high level procedural or object oriented programming language to communicate with a computer system including the computer system depicted in FIG. 2A of handheld communications device 104. However, the program(s) can be implemented in assembly or machine language, if desired. In any case, the language may be a compiled or interpreted language, and combined with hardware implementations.

Figure 2B:
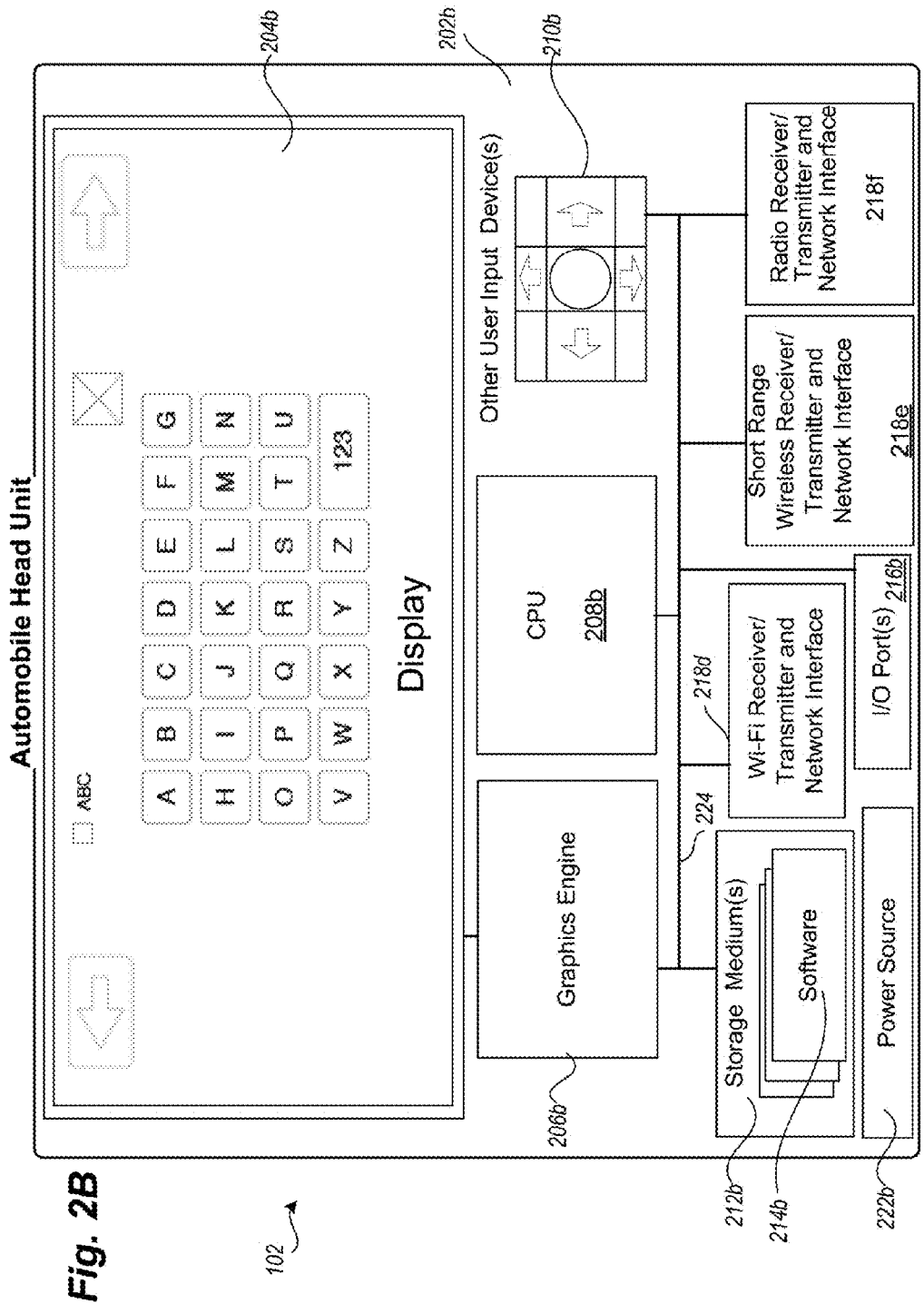
FIG. 2B is a schematic view of an automobile head unit shown in more detail according to one illustrated embodiment.

FIG. 2B shows an example handheld communications device 104 shown in more detail according to one illustrated embodiment. The handheld communications device 104 may have a housing 202a, a display 204a, a graphics engine 206a, a central processing unit (CPU) 208, one or more user input devices 210a, one or more storage mediums 212a having various software modules stored thereon comprising instructions that are executable by the CPU 208, input/output (I/O) port(s) 216a, a Wi-Fi receiver/transmitter and network interface 218b, a short range wireless receiver/transmitter and network interface 218aab, a cellular receiver/transmitter and network interface 218c, and a power source 222a.

As previously noted, the handheld communications device 104 may be any of a large variety of communications devices such as a cellular telephone, a portable media player (PMP), a personal digital assistant (PDA), a mobile communications device, portable computer with built-in or add-on cellular communications, a portable game console, a global positioning system (GPS), a handheld industrial electronic device, or the like, or any combination thereof. The handheld communications device 104 has at least one central processing unit (CPU) 206a which may be a scalar processor, a digital signal processor (DSP), a reduced instruction set (RISC) processor, or any other suitable processor. The central processing unit (CPU) 208, display 204a, graphics engine 206a, one or more user input devices 210a, one or more storage mediums 212a, input/output (I/O) port(s) 216a, Wi-Fi receiver/transmitter and network interface 218b, short range wireless receiver/transmitter and network interface 218aab, and cellular receiver/transmitter and network interface 218c may all be communicatively connected to each other via a system bus 224a. The system bus 224a can employ any suitable bus structures or architectures, including a memory bus with memory controller, a peripheral bus, and/or a local bus.

The handheld communications device 104 also includes one or more volatile and/or non-volatile storage medium(s) 212a. The storage mediums 212a may be comprised of any single or suitable combination of various types of processor-readable storage media and may store instructions and data acted on by CPU 208. For example, a particular collection of software instructions comprising software 214a and/or firmware instructions comprising firmware are executed by CPU 208. The software or firmware instructions generally control many of the operations of the handheld communications device 104 and a subset of the software and/or firmware instructions may perform functions to operatively configure hardware and other software in the handheld communications device 104 to provide the initiation, control and maintenance of applicable computer network and telecommunication links from the handheld communications device 104 to the external automobile head unit 102, cellular tower and station 106 and external computer network 108 as shown in FIG. 1 via the Wi-Fi receiver/transmitter and network interface 218b, short range wireless receiver/transmitter and network interface 218aab, cellular receiver/transmitter and network interface 218c, and/or I/O ports shown in FIG. 2A.

By way of example, and not limitation, the storage medium(s) 212a may be processor-readable storage media which may comprise any combination of computer storage media including volatile and nonvolatile, removable and non-removable media implemented in any method or technology for storage of information such as computer readable instructions, data structures, program modules or other data. Processor-readable storage media includes, but is not limited to, random access memory (RAM), read only memory (ROM), electrically erasable programmable read only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may accessed by CPU 208. Combinations of any of the above should also be included within the scope of processor-readable storage media.

The storage medium(s) 212a may include system memory which includes computer storage media in the form of volatile and/or nonvolatile memory such as read only memory (ROM) and random access memory (RAM). A basic input/output system (BIOS), containing the basic routines that help to transfer information between elements within handheld communications device 104, such as during start-up or power-on, is typically stored in ROM. RAM typically contains data and/or program modules that are immediately accessible to and/or presently being operated on by CPU 208. By way of example, and not limitation, FIG. 2A illustrates software modules 214a including an operating system, application programs and other program modules that implement the processes and methods described herein.

The handheld communications device 104 may also include other removable/non-removable, volatile/nonvolatile computer storage media drives. By way of example only, the storage medium(s) 212a may include a hard disk drive or solid state storage drive that reads from or writes to non-removable, nonvolatile media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in an operating environment of the handheld communications device 104 include, but are not limited to, flash memory cards, digital versatile disks, micro-discs, digital video tape, solid state RAM, solid state ROM, and the like. The storage medium(s) are typically connected to the system bus 224a through a non-removable memory interface. The storage medium(s) 212a discussed above and illustrated in FIG. 2A, provide storage of computer readable instructions, data structures, program modules and other data for the handheld communications device 104. In FIG. 2A, for example, a storage medium may store software 214a including an operating system, application programs, other program modules, and program data. The storage medium(s) 212a may implement a file system, a flat memory architecture, a database, or any other method or combination capable for storing such information.

A user may enter commands and information into the handheld communications device 104 through touch screen display 204a or the one or more input device(s) 210a such as a keypad, keyboard, camera, motion sensor, position sensor, light sensor, biometric data sensor, accelerometer, or a pointing device, commonly referred to as a mouse, trackball or touch pad. Other input devices of the handheld communications device 104 may include a microphone, joystick, game pad, optical scanner, other sensors, or the like. Example use of the input devices, in particular the microphone, is described in greater detail below in conjunction with communications to external servers. These and other input devices are often connected to the CPU 208 through a user input interface that is coupled to the system bus 224a, but may be connected by other interface and bus structures, such as a parallel port, serial port, wireless port, game port or a universal serial bus (USB). Generally, a unique software driver stored in software 214a configures each input mechanism to sense user input, and then the software driver provides data points that are acted on by CPU 208 under the direction of other software 214a. The display is also connected to the system bus 224a via an interface, such as the graphics engine 206a. In addition to the display 204a, the handheld communications device 104 may also include other peripheral output devices such as speakers, a printer, a projector, an external monitor, etc., which may be connected through one or more analog or digital I/O ports 216a or network interfaces of the Wi-Fi receiver/transmitter and network interface 218b, short range wireless receiver/transmitter and network interface 218aab or cellular receiver/transmitter and network interface 218c.

The handheld communications device 104 may operate in a networked environment using connections to one or more remote computers or devices, such as a remote computer or device within the computer network 108, the cellular tower and station 106, and the automobile head unit 102 shown in FIG. 1 and described above. The remote computer within computer network 108 may be a personal computer, a server, a router, a network PC, a peer device or other common network node, and typically includes many or all of the elements described above relative to the handheld communications device 104. Such connections to the computer network 108 may include local area network (LAN) connections as described above or wide area network (WAN) connections, and/or other networks.

When used in a LAN or WAN networking environment, the handheld communications device 104 may be connected via the Wi-Fi receiver/transmitter and network interface 218b and/or the cellular receiver/transmitter and network interface. When used in a WAN networking environment, the handheld communications device 104 may include a modem or other means as part of the network interface(s) for establishing communications over the WAN, such as the Internet. The Wi-Fi receiver/transmitter and network interface 218b and/or the cellular receiver/transmitter and network interface may be communicatively connected to the system bus 224a. In a networked environment, program modules depicted relative to the handheld communications device 104, or portions thereof, may be stored in a remote memory storage device of a remote system.

The handheld communications device 104 has a collection of I/O ports 216a and/or short range wireless receiver/transmitter and network interfaces 218b for passing data over short distances to and from the handheld communications device 104 or for coupling additional storage to the handheld communications device 104. For example, serial ports, USB ports, Wi-Fi ports, Bluetooth® ports, IEEE 1394 (i.e., FireWire), and the like can communicatively couple the handheld communications device 104 to other computing apparatuses. Compact Flash (CF) ports, Secure Digital (SD) ports, and the like can couple a memory device to the handheld communications device 104 for reading and writing by the CPU 208 or couple the handheld communications device 104 to other communications interfaces such as Wi-Fi or Bluetooth transmitters/receivers and/or network interfaces.

Handheld communications device 104 also has a power source 222a (e.g., a battery). The power source 222a may supply energy for all the components of the handheld communications device 104 that require power when a traditional, wired power source is unavailable or otherwise not connected. Other various suitable system architectures and designs of the handheld communications device 104 are contemplated and may be utilized which provide the same, similar or equivalent functionality as those described herein.

FIG. 2B shows an exemplary automobile head unit 102 shown in more detail according to one illustrated embodiment. Automobile head unit 102 may have a housing 202b, a display 204, a graphics engine 206b, a central processing unit (CPU) 208, one or more user input devices 210b, one or more storage mediums 212b having various software modules stored thereon comprising instructions that are executable by the CPU 208, input/output (I/O) port(s) 216b, a Wi-Fi receiver/transmitter and network interface 218e, a short range wireless receiver/transmitter and network interface 218e, a cellular receiver/transmitter and network interface 218f, and a power source 222b.

As previously noted, may be any component of an automobile or vehicle configured to process or communicate information to a driver, passenger or other component of the automobile, or to control other components that process or communicate information to a driver, passenger or other component of the automobile. For example, automobile head unit 102 may have computer processing, communications and data storage capabilities that are implemented by a combination of one or more embedded processing, memory and communications units or modules of automobile head unit 102. Many automobile head units are typically a part of or control an automobile's in-dash stereo, navigation and/or other entertainment or driver information system.

Automobile head unit 102 has at least one central processing unit (CPU) 206b which may be a scalar processor, a digital signal processor (DSP), a reduced instruction set (RISC) processor, or any other suitable processor. The central processing unit (CPU) 208, display 204, graphics engine 206b, one or more user input devices 210b, one or more storage mediums 212b, input/output (I/O) port(s) 216b, Wi-Fi receiver/transmitter and network interface 218e, short range wireless receiver/transmitter and network interface 218e, and cellular receiver/transmitter and network interface 218f may all be communicatively connected to each other via a system bus 224b. The system bus 224b can employ any suitable bus structures or architectures, including a memory bus with memory controller, a peripheral bus, and/or a local bus.

Automobile head unit 102 also includes one or more volatile and/or non-volatile storage medium(s) 212b. The storage mediums 212b may be comprised of any single or suitable combination of various types of processor-readable storage media and may store instructions and data acted on by CPU 208. For example, a particular collection of software instructions comprising software 214b and/or firmware instructions comprising firmware are executed by CPU 208. The software or firmware instructions generally control many of the operations of automobile head unit 102 and a subset of the software and/or firmware instructions may perform functions to operatively configure hardware and other software in automobile head unit 102 to provide the initiation, control and maintenance of applicable computer network and telecommunication links from automobile head unit 102 to the external automobile head unit 102, cellular tower and station 106 and external computer network 108 as shown in FIG. 1 via the Wi-Fi receiver/transmitter and network interface 218e, short range wireless receiver/transmitter and network interface 218e, cellular receiver/transmitter and network interface 218f, and/or I/O ports shown in FIG. 2A.

By way of example, and not limitation, the storage medium(s) 212b may be processor-readable storage media which may comprise any combination of computer storage media including volatile and nonvolatile, removable and non-removable media implemented in any method or technology for storage of information such as computer readable instructions, data structures, program modules or other data. Processor-readable storage media includes, but is not limited to, random access memory (RAM), read only memory (ROM), electrically erasable programmable read only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may accessed by CPU 208. Combinations of any of the above should also be included within the scope of processor-readable storage media.

The storage medium(s) 212b may include system memory which includes computer storage media in the form of volatile and/or nonvolatile memory such as read only memory (ROM) and random access memory (RAM). A basic input/output system (BIOS), containing the basic routines that help to transfer information between elements within automobile head unit 102, such as during start-up or power-on, is typically stored in ROM. RAM typically contains data and/or program modules that are immediately accessible to and/or presently being operated on by CPU 208. By way of example, and not limitation, FIG. 2A illustrates software modules 214b including an operating system, application programs and other program modules that implement the processes and methods described herein.

Automobile head unit 102 may also include other removable/non-removable, volatile/nonvolatile computer storage media drives. By way of example only, the storage medium(s) 212b may include a hard disk drive or solid state storage drive that reads from or writes to non-removable, nonvolatile media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in an operating environment of automobile head unit 102 include, but are not limited to, flash memory cards, digital versatile disks, micro-discs, digital video tape, solid state RAM, solid state ROM, and the like. The storage medium(s) are typically connected to the system bus 224b through a non-removable memory interface. The storage medium(s) 212b discussed above and illustrated in FIG. 2A, provide storage of computer readable instructions, data structures, program modules and other data for automobile head unit 102. In FIG. 2A, for example, a storage medium may store software 214b including an operating system, application programs, other program modules, and program data. The storage medium(s) 212b may implement a file system, a flat memory architecture, a database, or any other method or combination capable for storing such information.

A user may enter commands and information into automobile head unit 102 through touch screen display 204 or the one or more input device(s) 210b such as a keypad, keyboard, camera, motion sensor, position sensor, light sensor, biometric data sensor, accelerometer, or a pointing device, commonly referred to as a mouse, trackball or touch pad. Other input devices of automobile head unit 102 may include a microphone, joystick, game pad, optical scanner, other sensors, or the like. Example uses of the input devices, may be in conjunction with communication to external servers. These and other input devices are often connected to the CPU 208 through a user input interface that is coupled to the system bus 224b, but may be connected by other interface and bus structures, such as a parallel port, serial port, wireless port, game port or a universal serial bus (USB). Generally, a unique software driver stored in software 214b configures each input mechanism to sense user input, and then the software driver provides data points that are acted on by CPU 208 under the direction of other software 214b. The display is also connected to the system bus 224b via an interface, such as the graphics engine 206b. In addition to the display 204, automobile head unit 102 may also include other peripheral output devices such as speakers, a printer, a projector, an external monitor, etc., which may be connected through one or more analog or digital I/O ports 216b or network interfaces of the Wi-Fi receiver/transmitter and network interface 218e, short range wireless receiver/transmitter and network interface 218e or cellular receiver/transmitter and network interface 218f.

Automobile head unit 102 may operate in a networked environment using connections to one or more remote computers or devices, such as a remote computer or device within the computer network 108, the cellular tower and station 106, and automobile head unit 102 shown in FIG. 1 and described above. The remote computer within computer network 108 may be a personal computer, a server, a router, a network PC, a peer device or other common network node, and typically includes many or all of the elements described above relative to automobile head unit 102. Such connections to the computer network 108 may include local area network (LAN) connections as described above or wide area network (WAN) connections, and/or other networks.

When used in a LAN or WAN networking environment, automobile head unit 102 may be connected via the Wi-Fi receiver/transmitter and network interface 218e and/or the cellular receiver/transmitter and network interface. When used in a WAN networking environment, automobile head unit 102 may include a modem or other means as part of the network interface(s) for establishing communications over the WAN, such as the Internet. The Wi-Fi receiver/transmitter and network interface 218e and/or the cellular receiver/transmitter and network interface may be communicatively connected to the system bus 224b. In a networked environment, program modules depicted relative to automobile head unit 102, or portions thereof, may be stored in a remote memory storage device of a remote system.

Automobile head unit 102 has a collection of I/O ports 216b and/or short range wireless receiver/transmitter and network interfaces 218e for passing data over short distances to and from automobile head unit 102 or for coupling additional storage to automobile head unit 102. For example, serial ports, USB ports, Wi-Fi ports, Bluetooth® ports, IEEE 1394 (i.e., FireWire), and the like can communicatively couple automobile head unit 102 to other computing apparatuses. Compact Flash (CF) ports, Secure Digital (SD) ports, and the like can couple a memory device to automobile head unit 102 for reading and writing by the CPU 208 or couple automobile head unit 102 to other communications interfaces such as Wi-Fi or Bluetooth transmitters/receivers and/or network interfaces.

Automobile head unit 102 also has a power source 222b (e.g., a battery). The power source 222b may supply energy for all the components of automobile head unit 102 that require power when a traditional, wired power source is unavailable or otherwise not connected. Other various suitable system architectures and designs of automobile head unit 102 are contemplated and may be utilized which provide the same, similar or equivalent functionality as those described herein.

It should be understood that the various techniques described herein may be implemented in connection with hardware, software and/or firmware or, where appropriate, with a combination of such. Thus, the methods and apparatus of the disclosure, or certain aspects or portions thereof, may take the form of program code (i.e., instructions) embodied in tangible media, such as floppy diskettes, CD-ROMs, hard drives, or any other machine-readable or processor-readable storage medium wherein, when the program code is loaded into and executed by a machine, such as a processor of a computer or handheld communications device, the machine becomes an apparatus for practicing various embodiments. In the case of program code execution on programmable computers or handheld communications devices, such generally includes a processor, a storage medium readable by the processor (including volatile and non-volatile memory and/or storage elements), at least one input device, and at least one output device. One or more programs may implement or utilize the processes described in connection with the disclosure, e.g., through the use of an API, reusable controls, or the like. Such programs are preferably implemented in a high level procedural or object oriented programming language to communicate with a computer system including the computer system depicted in FIG. 2A of automobile head unit 102. However, the program(s) can be implemented in assembly or machine language, if desired. In any case, the language may be a compiled or interpreted language, and combined with hardware implementations.

FIG. 2B shows an example automobile head unit 102 shown in more detail according to one illustrated embodiment. Automobile head unit 102 may have a housing 202b, a display 204, a graphics engine 206b, a central processing unit (CPU) 208, one or more user input devices 210b, one or more storage mediums 212b having various software modules stored thereon comprising instructions that are executable by the CPU 208, input/output (I/O) port(s) 216b, a Wi-Fi receiver/transmitter and network interface 218e, a short range wireless receiver/transmitter and network interface 218e, a cellular receiver/transmitter and network interface 218f, and a power source 222b.

As previously noted, automobile head unit 102 may be any of a large variety of communications devices such as a cellular telephone, a portable media player (PMP), a personal digital assistant (PDA), a mobile communications device, portable computer with built-in or add-on cellular communications, a portable game console, a global positioning system (GPS), a handheld industrial electronic device, or the like, or any combination thereof. Automobile head unit 102 has at least one central processing unit (CPU) 206b which may be a scalar processor, a digital signal processor (DSP), a reduced instruction set (RISC) processor, or any other suitable processor. The central processing unit (CPU) 208, display 204, graphics engine 206b, one or more user input devices 210b, one or more storage mediums 212b, input/output (I/O) port(s) 216b, Wi-Fi receiver/transmitter and network interface 218e, short range wireless receiver/transmitter and network interface 218e, and cellular receiver/transmitter and network interface 218f may all be communicatively connected to each other via a system bus 224b. The system bus 224b can employ any suitable bus structures or architectures, including a memory bus with memory controller, a peripheral bus, and/or a local bus.

Automobile head unit 102 also includes one or more volatile and/or non-volatile storage medium(s) 212b. The storage mediums 212b may be comprised of any single or suitable combination of various types of processor-readable storage media and may store instructions and data acted on by CPU 208. For example, a particular collection of software instructions comprising software 214b and/or firmware instructions comprising firmware are executed by CPU 208. The software or firmware instructions generally control many of the operations of automobile head unit 102 and a subset of the software and/or firmware instructions may perform functions to operatively configure hardware and other software in automobile head unit 102 to provide the initiation, control and maintenance of applicable computer network and telecommunication links from automobile head unit 102 to the external automobile head unit 102, cellular tower and station 106 and external computer network 108 as shown in FIG. 1 via the Wi-Fi receiver/transmitter and network interface 218e, short range wireless receiver/transmitter and network interface 218e, cellular receiver/transmitter and network interface 218f, and/or I/O ports shown in FIG. 2A.

By way of example, and not limitation, the storage medium(s) 212b may be processor-readable storage media which may comprise any combination of computer storage media including volatile and nonvolatile, removable and non-removable media implemented in any method or technology for storage of information such as computer readable instructions, data structures, program modules or other data. Processor-readable storage media includes, but is not limited to, random access memory (RAM), read only memory (ROM), electrically erasable programmable read only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may accessed by CPU 208. Combinations of any of the above should also be included within the scope of processor-readable storage media.

The storage medium(s) 212b may include system memory which includes computer storage media in the form of volatile and/or nonvolatile memory such as read only memory (ROM) and random access memory (RAM). A basic input/output system (BIOS), containing the basic routines that help to transfer information between elements within automobile head unit 102, such as during start-up or power-on, is typically stored in ROM. RAM typically contains data and/or program modules that are immediately accessible to and/or presently being operated on by CPU 208. By way of example, and not limitation, FIG. 2A illustrates software modules 214b including an operating system, application programs and other program modules that implement the processes and methods described herein.

Automobile head unit 102 may also include other removable/non-removable, volatile/nonvolatile computer storage media drives. By way of example only, the storage medium(s) 212b may include a hard disk drive or solid state storage drive that reads from or writes to non-removable, nonvolatile media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in an operating environment of automobile head unit 102 include, but are not limited to, flash memory cards, digital versatile disks, micro-discs, digital video tape, solid state RAM, solid state ROM, and the like. The storage medium(s) are typically connected to the system bus 224b through a non-removable memory interface. The storage medium(s) 212b discussed above and illustrated in FIG. 2A, provide storage of computer readable instructions, data structures, program modules and other data for automobile head unit 102. In FIG. 2A, for example, a storage medium may store software 214b including an operating system, application programs, other program modules, and program data. The storage medium(s) 212b may implement a file system, a flat memory architecture, a database, or any other method or combination capable for storing such information.

A user may enter commands and information into automobile head unit 102 through touch screen display 204 or the one or more input device(s) 210b such as a keypad, keyboard, camera, motion sensor, position sensor, light sensor, biometric data sensor, accelerometer, or a pointing device, commonly referred to as a mouse, trackball or touch pad. Other input devices of automobile head unit 102 may include a microphone, joystick, game pad, optical scanner, other sensors, or the like. Example use of the input devices, in particular the microphone, is described in greater detail below in conjunction with communications to external servers. These and other input devices are often connected to the CPU 208 through a user input interface that is coupled to the system bus 224b, but may be connected by other interface and bus structures, such as a parallel port, serial port, wireless port, game port or a universal serial bus (USB). Generally, a unique software driver stored in software 214b configures each input mechanism to sense user input, and then the software driver provides data points that are acted on by CPU 208 under the direction of other software 214b. The display is also connected to the system bus 224b via an interface, such as the graphics engine 206b. In addition to the display 204, automobile head unit 102 may also include other peripheral output devices such as speakers, a printer, a projector, an external monitor, etc., which may be connected through one or more analog or digital I/O ports 216b or network interfaces of the Wi-Fi receiver/transmitter and network interface 218e, short range wireless receiver/transmitter and network interface 218e or cellular receiver/transmitter and network interface 218f.

Automobile head unit 102 may operate in a networked environment using connections to one or more remote computers or devices, such as a remote computer or device within the computer network 108, service provider 1 and service provider 2, the cellular tower and station 106, and handheld communications device 104 shown in FIG. 1 and described above. The remote computer within computer network 108 may be a personal computer, a server, a router, a network PC, a peer device or other common network node, and typically includes many or all of the elements described above relative to automobile head unit 102. Such connections to the computer network 108 may include local area network (LAN) connections as described above or wide area network (WAN) connections, and/or other networks.

When used in a LAN or WAN networking environment, automobile head unit 102 may be connected via the Wi-Fi receiver/transmitter and network interface 218e and/or the cellular receiver/transmitter and network interface 218f. When used in a WAN networking environment, automobile head unit 102 may include a modem or other means as part of the network interface(s) for establishing communications over the WAN, such as the Internet. The Wi-Fi receiver/transmitter and network interface 218e and/or the cellular receiver/transmitter and network interface may be communicatively connected to the system bus 224b. In a networked environment, program modules depicted relative to automobile head unit 102, or portions thereof, may be stored in a remote memory storage device of a remote system.

Automobile head unit 102 has a collection of I/O ports 216b and/or short range wireless receiver/transmitter and network interfaces 218e for passing data over short distances to and from handheld device 104 or for coupling additional storage to automobile head unit 102 or to communicate with other external devices. For example, serial ports, USB ports, Wi-Fi ports, Bluetooth® ports, IEEE 1394 (i.e., FireWire), and the like can communicatively couple automobile head unit 102 to other computing apparatuses. Compact Flash (CF) ports, Secure Digital (SD) ports, and the like can couple a memory device to automobile head unit 102 for reading and writing by the CPU 208 or couple automobile head unit 102 to other communications interfaces such as Wi-Fi or Bluetooth transmitters/receivers and/or network interfaces.

Automobile head unit 102 also has a power source 222b (e.g., a battery). The power source 222b may supply energy for all the components of automobile head unit 102 that require power when an automobile power source is unavailable or otherwise not connected. Other various suitable system architectures and designs of automobile head unit 102 are contemplated and may be utilized which provide the same, similar or equivalent functionality as those described herein.

It should be understood that the various techniques described herein may be implemented in connection with hardware, software and/or firmware or, where appropriate, with a combination of such. Thus, the methods and apparatus of the disclosure, or certain aspects or portions thereof, may take the form of program code (i.e., instructions) embodied in tangible media, such as floppy diskettes, CD-ROMs, hard drives, or any other machine-readable or processor-readable storage medium wherein, when the program code is loaded into and executed by a machine, such as a processor of a computer or handheld communications device, the machine becomes an apparatus for practicing various embodiments. In the case of program code execution on programmable computers or handheld communications devices, such generally includes a processor, a storage medium readable by the processor (including volatile and non-volatile memory and/or storage elements), at least one input device, and at least one output device. One or more programs may implement or utilize the processes described in connection with the disclosure, e.g., through the use of an API, reusable controls, or the like. Such programs are preferably implemented in a high level procedural or object oriented programming language to communicate with a computer system including the computer system depicted in FIG. 2A of automobile head unit 102. However, the program(s) can be implemented in assembly or machine language, if desired. In any case, the language may be a compiled or interpreted language, and combined with hardware implementations.

Figure 3A:
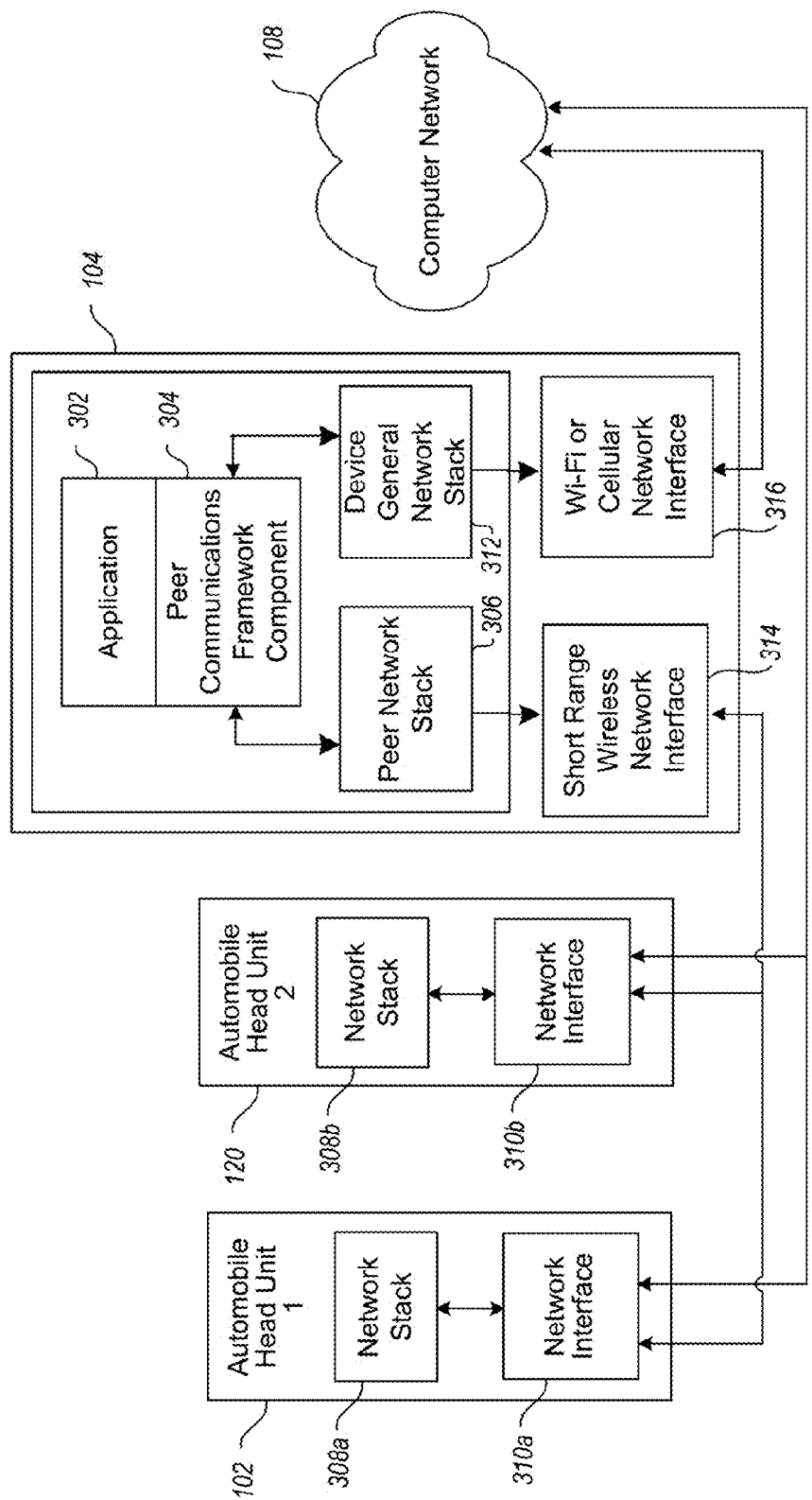
FIG. 3A is a schematic diagram, according to one illustrated embodiment, showing software modules of the handheld communications device in more detail including an application, a peer communications framework component, a network stack of the handheld communications device interconnected with a network stack of a plurality of automobile head units, and another network stack of the handheld communications device interconnected to another computer network.

FIG. 3A shows example software modules of the handheld communications device 104 in more detail according to one illustrated embodiment. The software modules include an application 302, a peer communications framework component 304, a network stack of the handheld communications device 104 such as a peer-to-peer (i.e., peer) network stack 306 preferably wirelessly interconnected with a network stack 308 of the automobile head unit 102 via a network interface 310 of the automobile head unit 102, and another network stack such as a device general network stack 312 of the handheld communications device 104 interconnected to the computer network 108.

A network stack (i.e., a protocol stack or communications stack) is a particular software implementation of a group of layered computer networking protocols. Example descriptions of layered communications and computer network protocol design and particular TCP/IP network protocols provided herein are available in the Wikipedia.com articles "OSI Model" found at http://en.wikipedia.org/wiki/OSI_Reference_Model and "TCP/IP Model" found at http://en.wikipedia.org/wiki/TCP/IP_model, which are both hereby incorporated by reference in their entirety and Request for Comments (RFC)1122 and RFC 1123 available at http://tools.ietf.org/html/rfc1122 and http://tools.ietf.org/html/rfc1123, respectively, published by the Internet Engineering Task Force (IETF) and both also hereby incorporated by reference in their entirety. The network stack is the software implementation of a group of layered protocols. Because each protocol module usually communicates with two others, they are often referred to as layers in a stack of protocols. The lowest protocol deals with "low-level", physical interaction of the hardware. Every higher layer adds more features. User and other specific applications usually communicate with the topmost layers. Network stacks are often divided into three major sections: media, transport, and applications. A particular operating system or platform will often have two well-defined software interfaces: one between the media and transport layers, and one between the transport layers and applications. The media-to-transport interface defines how transport protocol software makes use of particular media and hardware types. For example, the media-to-transport interface level would define how TCP/IP transport software would communicate with Ethernet hardware. The application-to-transport interface defines how application programs make use of the transport layers. For example, the application-to-transport interface level would define how a Web browser program would communicate with TCP/IP transport software. In the present example, the peer communications framework component 304 may have one or more sub-modules or routines operating at or communicating with various layers of the peer network stack 306 and general network stack 312. The structure of the example peer-to-peer network stack is shown in further detail in FIG. 3A.

The application 302 may interface with the peer communications framework component 304 through an application programming interface (API) and may work as middleware, with a separate connection to both the computer network 108 (e.g., the Internet) and to an external device, such as the automobile head unit 102. The peer network stack 306 and the general stack 312 may be communicatively connected to the automobile head unit 102 and the computer network 108, respectively, via a separate physical or logical short range wireless network Interface 314 (e.g., a Bluetooth® interface) and a Wi-Fi or cellular network interface 316 in communication with one or more lower layers of the peer network stack 306 and general network stack 312. The peer network stack 306 and automobile head unit 102 network stack provide a peer-to-peer network connection between the automobile head unit 102 and handheld communications device 104. A peer-to-peer (P2P) connection is a connection between two devices to share resources without going through a separate server computer between them. In particular, the peer-to-peer connection of FIG. 3A consists of a connection between two devices consisting of the handheld communications device 104 and the automobile head unit 102. There are no other intervening devices or nodes on the peer-to-peer network between the handheld communications device 104 and the automobile head unit 102.

Although the handheld communications device 104 may have a separate connection out to the Internet via the general network 312 stack co-existing on the same handheld communications device 104, the peer network stack 306 and the general stack 312 are not directly connected in the present example. For example, an HTTP request from the external device (e.g., the automobile head unit 102) to the handheld communications device 104 is not merely forwarded out to the Internet, but rather is handled by the peer communications framework component 304 and by the application 302 using it. The peer communications framework component 304 may service the request in many different ways including, but not limited to returning a file cached on the handheld communications device 104, returning data generated at runtime based on the request, proxying out to the Internet via the general network stack 312 and forwarding/caching the results as needed to the automobile head unit 102. These operations are enabled by the peer communications framework component 304 and its associated application 302 being connected to both the peer network stack 306 and the general stack 312. Thus, the system of the handheld communications device 104 does not merely act as a general proxy, but rather as a service provider with multiple functions.

The peer network stack 306 and automobile head unit 102 network stack may provide a peer-to-peer network connection on a serial data transport link between the automobile head unit 102 and handheld communications device 104. As shown in FIG. 1, the automobile head unit 102 and handheld communications device 104 may be communicatively linked by a short range wireless signal 100. For example, this short range wireless signal may be that of a wireless Bluetooth® or a wired Universal Serial Bus (USB) link. However, other wireless or wired connections that support serial or parallel data transport may also be used. The link between the automobile head unit 102 and handheld communications device 104 may be automatically established when the handheld communications device 104 comes into the vicinity of the automobile head unit 102 according to various protocols and/or standards of the applicable type of short range wireless link.

The peer-to-peer network connection is relatively secure. It may be specified to be a connection between only two devices using a secure data transport link at the physical layer of the peer network stack 306. Bluetooth® supports automatically and transparently encrypting the data flows and this functionality may be relied upon in particular embodiments using Bluetooth® Serial Port Profile (SPP) as the transport mechanism at the physical layer of the peer network stack 306. In particular embodiments using a wired USB link in the transport mechanism, the connection would be difficult to tap without physically altering the hardware. To add to this security, certain services may require HTTP digest authentication.

The handheld communications device 104 may have particular network services available natively at the handheld communications device 104 and others that are not available natively at the handheld communications device 104. The peer communications framework component 304 may handle the communications from the automobile head unit 102 such that the handling the communications received from the automobile head unit 102 via the peer-to-peer connection enables the automobile head unit 102 to handle network communications in a same manner irrespective of whether the one or more particular network services are available at all to the automobile head unit 102 via the handheld communications device 104. For example, both the peer network stack 306 and the automobile head unit 102 network stack 308 may provide a minimal HTTP or HTTPS server and both may be able to make HTTP or HTTPS requests to the other device. The peer network stack 306 in conjunction with the peer communications framework component 304 may provide a superset of that minimal support, including, but not limited to: an HTTP or HTTPS server that provides various services available over the peer-to-peer network between the automobile head unit 102 and handheld communications device 104 natively at the handheld communications device 104, the ability to pass other service requests to the application 302 for processing, and the ability to make HTTP requests to the automobile head unit 102. However, the automobile head unit 102 need not communicate differently with the handheld communications device 104 if particular network services are not available at or via the handheld communications device 104 over the peer-to-peer connection as the corresponding response from the handheld communications device 104 will handle such requests in an appropriate manner according to the particular network protocol (e.g., TCP/IP) to enable further communications between the automobile head unit 102 and the handheld communications device 104 without interrupting the connection. For example, if the handheld communications device 104 does not provide services such as Dynamic Host Configuration Protocol (DHCP) or Address Resolution Protocol (ARP), requests for such services will be ignored or otherwise responded to in a manner enabling the requester to continue communications in a normal manner without interrupting the current network connection or session. Thus, the automobile head unit 102 requires no "knowledge" of whether particular network services are supported or provided by the handheld communications device 104 beyond a minimal set of network services.

In one example embodiment, each device (e.g., the automobile head unit 102 and handheld communications device 104) in the peer-to-peer connection has a specific role. In the present example, the handheld communications device 104 acts as a Bluetooth® server and as the "anchor" of the connection. It uses a specified IP address, for example, "168.100.10.1". The external device (e.g., the automobile head unit 102) acts as an external device without a connection to the server-based computer network 108 (in this case, the Internet). It uses a different specified IP address, for example, "168.100.10.2". However, in a scenario where there exists only two peers on the peer-to-peer connection (e.g., the automobile head unit 102 and handheld communications device 104), the destination network address of communications between the two peers may be ignored as it may be assumed that the intended destination is the network peer other than the one which sent the communication. The handheld communications device 104 or "anchor" device has a connection out to the server-based system computer network 108 (e.g., the general Internet), which it uses to retrieve files for caching and for other purposes appropriate to the application 302. It also controls the peer connection process with the external device (e.g., the automobile head unit 102). The external device does not require an Internet connection and will use its "anchor" peer (e.g., the handheld communications device 104) to get files and perform services. It may expect to act as the client in the peer connection process.

Services are provided between the handheld communications device 104 and the automobile head unit 102 via the peer network stack 306 and the automobile head unit 102 network stack 308 by HTTP GET and POST requests where the service name is the file/path name portion of the URL. These services may use normal HTTP semantics and headers and provide the data using standard Multipurpose Internet Mail Extensions (MIME) types. The handheld communications device 104 may provide the HTTP server on port 80. Thus, a request to the handheld communications device 104 may look like "http://168.100.10.1:80/servicename?foo=bar". The external device (e.g., the automobile head unit 102) provides the HTTP server on port 8080. Thus, a request to the external device may look like "http://168.100.10.1:8080/servicename?foo=bar". Depending on the service requested, the data returned may be retrieved from a locally cached file, generated at runtime, or requested on a separate network connection and forwarded to the peer or cached locally for the next request. For example, voice can be processed locally on the handheld communications device 104 or sent to a server for processing. If sent to a server, the results of voice processing can be returned handheld communications device 104 as a parse tree, a list of 1 to N possible matches, an error, or even set to yet another server for processing into code telling the handheld communications device 104 what to do next. For example the server could form a query to another second server that appears to the second server like the results of haptic (touch/keyboard) input and the second server could respond in exactly the same way as if the original input had been haptic on the handheld communications device 104. The voice processing server could then forward those results back to the handheld communications device 104.

Services may be provided by the associated application 302, using API calls to the peer communications framework component 304. Certain services are native to the peer communications framework component and can operate without application intervention. Such services include (but are not limited to) service discovery (which lists available services), file retrieval (which provides files from the cache, with aliasing, and supports cache modification), and controlled Internet proxy (which forwards requests to pre-selected Internet servers, with aliasing).

Discoverability of available services is provided by a specific service that is provided by at least one peer (e.g., the handheld communications device 104 or the automobile head unit 102). In the present example, this would be the handheld communications device 104 (the "anchor" device) and the discoverability service is available natively at the peer communications framework component 304. In one embodiment, this service may return a specified Extensible Markup Language (XML) file describing the available services. For example, the URL of the file may be "http://168.100.10.1:80/servicelist". The service list contains enough information for the external device (e.g., the automobile head unit 102) to create menus of available services and to access the available services to obtain more information as needed. In most cases each peer (e.g., the automobile head unit 102 and the handheld communications device 104) will request the service list from the other. The details of the service list may be specified with configuration data supplied to the peer communications framework component 304 on initialization. This configuration may be provided by the application 302 or maintained on the computer network 108 (e.g., the Internet). In the latter case, the configuration will be downloaded by the application 302 on startup of the handheld communications device 104, allowing the available services of the handheld communications device 104 to change over time without refreshing the application 302. The handheld communications device 104 may determine whether a request from the automobile head unit 102 corresponds to a service in a file describing the available services. The handheld communications device 104 may then forward the request to the server-based computer network 108 if it was determined that the request corresponds to a service in the file describing the available services.

Also, information may be communicated from the handheld communications device 104 (the "anchor" device) to configure a user interface of the external device (e.g., the automobile head unit 102) to visually match a corresponding user interface of the handheld communications device 104 by communicating information over the serial data transport link from the handheld communications device 104 to the automobile head unit 102. Also, information may be communicated from the handheld communications device 104 (the "anchor" device) to configure or provide other information to the external device. The information may contain data adapted for use by the automobile head unit 102 to configure the user interface of the automobile head unit 102 to visually match the corresponding user interface of the handheld communications device 104. The information may contain data adapted for use by the automobile head unit 102 to configure other components or applications of the automobile head unit 102. In one example, the information included in the data returned to the automobile head unit 102 may be for display on the user interface of the automobile head unit 102 that is configured to visually match the corresponding user interface of the handheld communications device handheld communications device handheld communications device 104. The information may also be obtained from and configured on a remote server on the server-based computer network 108 and be configured such that a user interface of the handheld communications device 104, automobile head unit 102 and one or more remote devices on the server-based computer network 108 substantially match each other.

As the handheld communications device 104 may in some instances not always be connected to the computer network 108, but preferably still be capable of providing services to the external device (e.g., the automobile head unit 102), the peer communications framework component 304 may provide intelligent file caching and pre-loading to increase the chances that data will be available when requested. The peer communications framework component 304 may monitor types of and patterns of requests received from the automobile head unit 102 and cache on one or memories of the handheld communications device 104 at least a portion of a response received from the server-based computer network 108 based upon the types of and patterns of the requests received. Particular parts of the file caching service such as the monitoring of types of and patterns of requests received may be implemented on an Internet server, making the intelligence of the system more powerful and easy to extend. The actual management of the cache may occur on the client (e.g., the handheld communications device 104), where the capacity and capabilities of that device are known. For example, the peer communications framework component 304 may include a client that requests cache control data from a server on the server-based computer network 108, which specifies what files are to be cached along with metadata the client uses to control how the cache is managed. The client then attempts to load those files from the network 108 and store them locally on the handheld communications device 104, making them available for the peer communication control component and the local application 302. If a file is requested from the cache that has not yet been loaded on the handheld communications device 104 or that is not in the cache control data, that file may be immediately requested from the network 108 and cached before it is provided to the requester (e.g., the automobile head unit 102).

Either peer (e.g., the handheld communications device 104 or the automobile head unit 102), or both peers, in the peer-to-peer connection between the peers may run an application that uses an identical or similar peer communications framework component to communicate with the other peer. This application will control the connection process on the "anchor" peer. The "external" peer can also run an identical or similar peer communications framework component 304 or may act as a "non-anchor" peer. However, the peer communications framework component 304 may be designed to link to one application 302 on a device at a time or several applications. If there is a need for several co-operating applications on the handheld communications device 104 to use the peer communications framework component 304 at the same time, a "wrapper" application may be used which provides cross-task communications appropriate for the device.

On a device (like a head unit 102) which is connected to the peer communications framework component 304 but believes it is connected to a general framework, the network stack on the head unit 102 may be used by several applications at the same time without requiring any "wrapper".

The peer communications framework component 304 may be implemented and provided as a code library, in both C/C++ and Java™ versions, for multiple platforms. Depending on the platform the peer communications framework component 304 and associated modules and routines may be provided as source code and/or as a pre-compiled binary file that can be linked into the code of the particular application 302. In some embodiments, the binary file may be runtime linkable, allowing several applications to share a single peer communications framework component 304 library on the same device. Examples of versions in which the peer communications framework component 304 may be provided in runtime link form include, but are not limited to, Binary Runtime Environment for Wireless (BREW) as a BREW extension, and Java Mobile Information Device Profile (MIDP) as a Java Archive (JAR) file. Custom versions of the peer communications framework component 304 library can be provided, which may include only some of the peer communications framework component 304 modules. In an embodiment where a handheld communications device 104 can multi-task, the runtime linking described above may be used, and the peer communications framework component 304 may be implemented as a stand-alone application in order to implement this particular embodiment. In an embodiment where handheld communications device 104 cannot multi-task, the applications on the handheld communications device 104 may co-operate by shutting down and starting a different application when requested by the head unit 102. Such scenarios may involve shutting down and restarting the peer communications framework component 304 when the application changes.

Figure 3B:
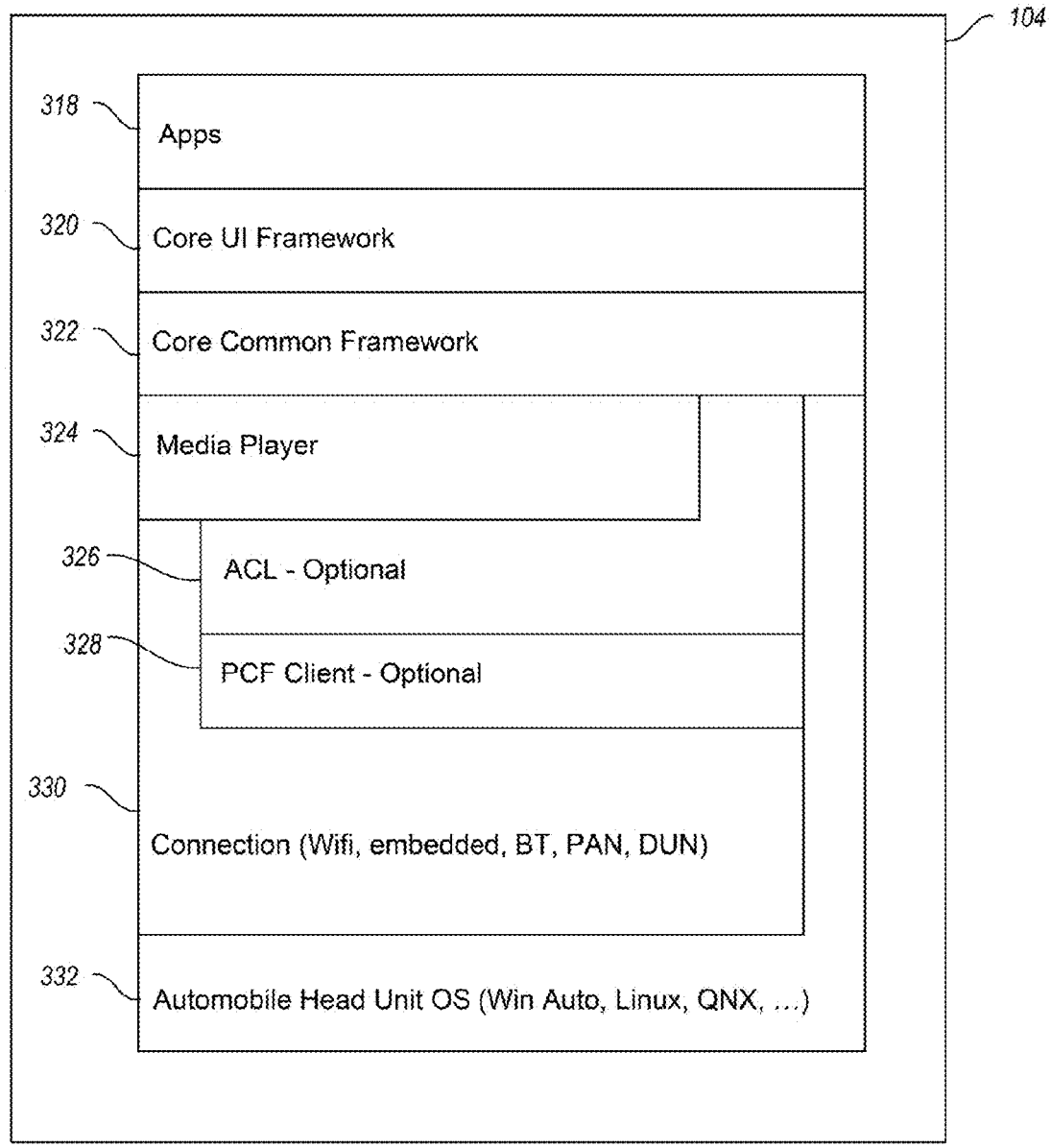
FIG. 3B is a schematic diagram, according to one illustrated embodiment, showing software modules of the head unit according to one illustrated embodiment.

FIG. 3B is a schematic diagram, according to one illustrated embodiment, showing software modules of the head unit 104 according to one illustrated embodiment. Shown is a relatively hierarchical layering of various software components that may communicate with each other through applicable application programming interface (API) calls. The applications layer 318 (Apps) is at the top, and may include various high level applications (e.g., navigation system applications, etc.). The core user interface framework layer 320 is shown next, then the core common framework layer 322, a media player 324, an access control layer 326, a peer communication framework client 328 (which is optional) a connection layer 330, and the lower automobile head unit 332 operating system layer is shown at the bottom.

Figure 4A:
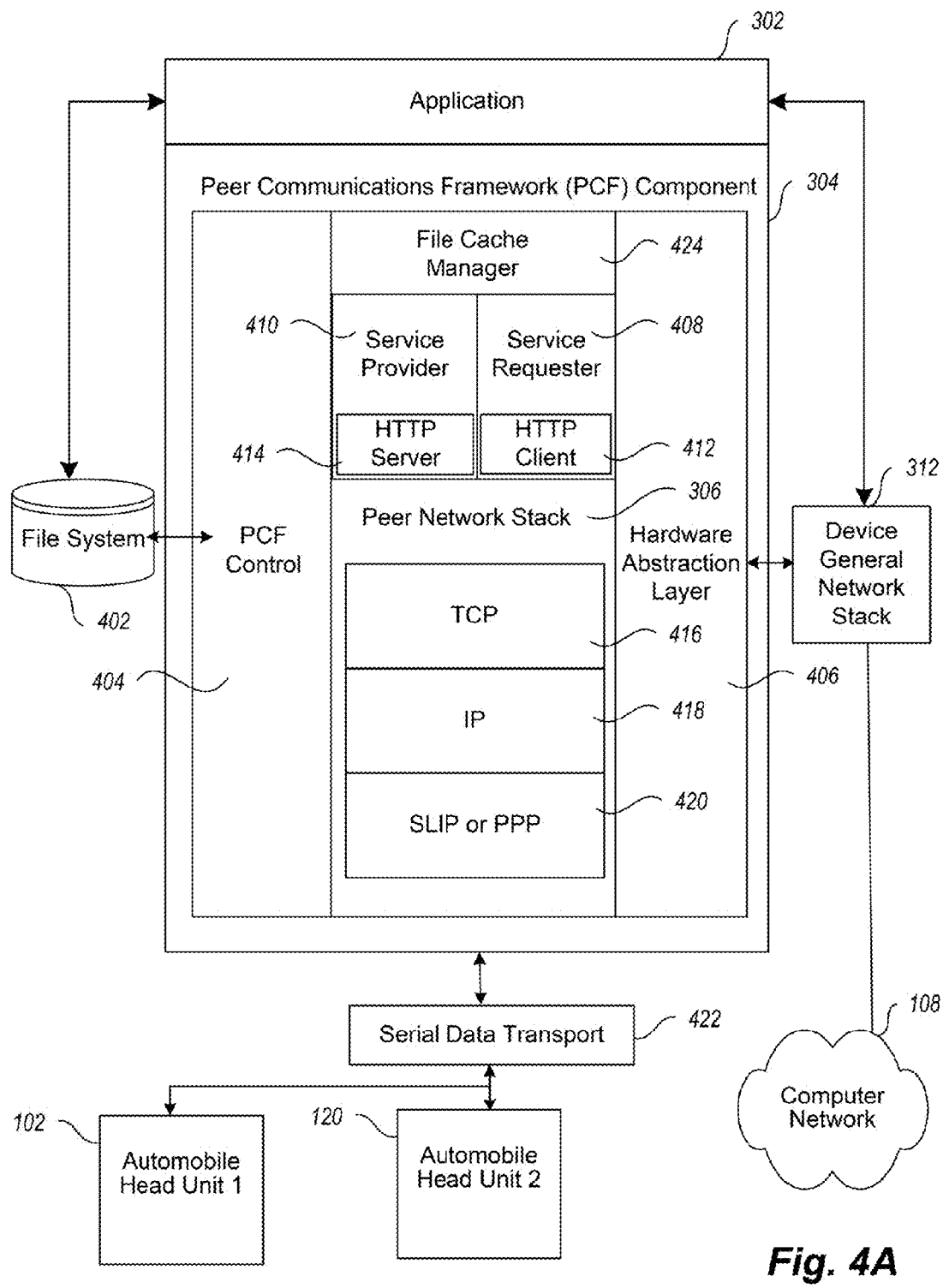
FIG. 4A is a schematic diagram showing, according to one illustrated embodiment, the peer communications framework component and the network stacks of the handheld communications device in greater detail including their logical connectivity to each other and a file system of the handheld communications device and the connection to the head units.

FIG. 4A is shows one example of the peer communications framework component 304 and the network stacks 306 312 of the handheld communications device 104 in greater detail according to one illustrated embodiment, including their logical connectivity to each other and a file system 402 of the handheld communications device 104. Although the modules of FIG. 4A are described in the present example as being components of the "anchor" peer (e.g., the handheld communications device 104), such modules of the peer communications framework component 304 may also be present in the external device (e.g., the automobile head unit 102) such that it may also act as a service provider and requester and provide peer communications framework component 304 functionality. Also, aspects of the PCF example described herein are also described in U.S. Patent Application Publication No. 2011/0289186, which is incorporated herein by reference in its entirety.

The peer communications framework component 304 provides an integrated framework comprising of several components, each with their own APIs that an application 302 can use to control the peer communications framework component 304 and communicate with a peer device. These components are also leveraged within the peer communications framework control 404 to provide the basic services. The peer communications framework component 304 may have two components including, but not limited to, a control routine 404 and a hardware abstraction layer 406. The peer communications framework control 404 initializes the peer communications framework control 404, supplies global utilities, and provides a way to initiate and terminate peer connections. The peer communications framework control 404 and hardware abstraction layer 406 components operate at or communicate with various layers of the peer network stack 306, general network stack 312, and the service requester 408 and service provider 410 modules such that they may receive, process and send information in order to request and provide services, and control communications and operations of the device on which the peer communications framework component 304 is running. In particular, the hardware abstraction layer 406 isolates the peer communications framework component 304 code from the underlying device (e.g., the handheld communications device 104), by providing abstractions of the serial data transports (Bluetooth® SPP, USB, etc.), the device general network stack 312 functionality (cellular, Wi-Fi, etc.), and the device file system 402. These abstractions are then implemented for each local device, creating a unique port of the peer communications framework component 304 for that device. Alternative embodiments of the peer communications framework control 404 include peer network port objects with TCP and UDP support that the application 302 can use to implement protocols other than HTTP.

On application startup the application 302 may initialize and start the peer communications framework control 404, passing in the location of an appropriate configuration file. The peer communications framework control 404 configuration file may have an XML layout with sections for each of the major functional areas.

In some embodiments, the peer communications framework control 404 does not define the meaning of service names, profile names, or the name/value pairs used to provide information to the containing tags. This is configurable by the particular implementation. For this reason, it may be desirable for network peers to namespace the particular service and info names of the network peer in a manner to avoid name collisions with other implementations and/or establish open naming standards which include detailed specifications for how a service works or a profile is used. Each peer is configured to know how to access the services and profiles it recognizes.

The network section of the configuration file defines how the network is initialized and the data transport over which the peer connection is made. The data transport configuration specified in the configuration file specifies the data transport to use, the role the device plays in the connection, and includes a set of name/value pairs that have meaning to that data transport. If the named transport is not available, the configuration is aborted and an error is returned to the application 302. The IP configuration specified in the configuration file specifies the IP address the device will use and what service ports on which it will receive requests and to which it will make requests. The services section of the configuration file provides a list of services a peer can perform and, optionally, lists of arbitrary name/value pairs attached to a service that have meaning in context with the service. For example, the name Services may be associated with a profile. Services have a type, which specifies how the peer communications framework control 404 handles a request to that service. In the present example, the following types are supported: app, file, proxy, and custom. Services may contain a list of name/value pairs associated with that service, the meanings of which are application dependent. For example, these name/value pairs could provide the information required to determine which arguments the service supports. The cache section of the configuration file indicates how to clear the cache on startup and provides a list of files to cache. Cached files may be associated with a profile. The proxy control section of the configuration file supports a set of "allow" and "deny" patterns defining which URLs are valid for remote proxy and file caching requests. For example, a valid URL must match at least one of the "allow" patterns and cannot match any of the "deny" patterns. The profiles section of the configuration file provides application dependent metadata about groups of items (e.g., services and files) which are associated with that profile. Profiles may contain a list of name/value pairs associated with that service, the meanings of which are application dependent. For example, these name/value pairs provide the information required to build a menu of the available services for an example profile named "weatherApp".

After the location of an appropriate configuration file is passed, the peer communications framework control 404 will then obtain a fresh copy of the configuration file (e.g., from a server on the Internet or from a local file system). The configuration file may be parsed and the appropriate configuration data is then supplied to the various components. When the application 302 requests, the peer communications framework control 404 will start looking for another peer using the data transport and device role defined in the configuration. When a connection is made, the peer communications framework control 404 will inform the application 302. If no connection is made, the peer communications framework control 404 will continue to search for a peer until told to stop. At any time after a connection is made, the application 302 can request the connection to be terminated. If the connection fails for any reason (e.g., normal termination, timeout, etc.) the application 302 will be informed.

The file cache manager component 424 handles downloading and caching of files from an external network such as computer network 108 (e.g., the Internet) supplying them to the application 302 and to the service provider 410 on request from a peer device (e.g., the automobile head unit 102). For example, the configuration file (e.g., an XML file) managed by the peer communications framework control 404 includes a cache control section that specifies what files to download and cache, along with metadata that determines how each file is handled. Using the applicable cache control XML from the configuration as a guide, the file cache manager component 424 then starts cleaning up the local cache and loading new files as a background process for as long as the application 302 runs. The cache itself may be a standard directory on the device file system 402 and the files may be saved there in the same format as they were retrieved from the network 108. A combination of device specific rules for the total size of the cache, the cleanup section of the cache control, and the individual file cache control metadata will determine what older files are removed from the cache before loading starts or as it progresses. The cache manager component 424 will prevent the total cache size from exceeding a device specific value. The files themselves are retrieved from the network using a URL supplied in the individual file cache control metadata. The file cache manager component 424 also provides the ability for the application 302 and the connected peer (e.g., the automobile head unit 102) to add files to the cache list and/or override the cache metadata of a file in the cache control. Once added to the list, a file requested locally is handled using the caching rules described above.

The file cache manager component 424, for example, may provide two methods to retrieve file data: as a binary stream and as a file location in the form of a URL. A particular file may be requested as a binary stream by name from the file cache manager component 424 at any time. The request may optionally include cache metadata that overrides the metadata supplied in the cache control. If the requested file name is not in the cache control, it is added to the cache using either the metadata previously passed or default values for optional metadata. When a file is requested, the file cache manager component 424 will look first to see if it is currently in the cache. If it is not in the cache, the file cache manager component 424 will then request the file using the standard file cache rules, but moving it up in load order to that moment. For files already in the cache, the file is opened and the data is supplied as a binary stream. For files not yet in the cache, the file is retrieved from the network first, written to the file cache, and then opened as previously described.

The file cache manager component 424 may provide a second method of file access that is indirect and bypasses the automatic caching mechanism described above. In such a case, a file's location is requested by name and either the file cache manager returns a local file system URL (for example, "file://some/path/foo.bar") when the file is already in the cache or the file cache manager component 424 returns a network URL (for example "http://some.domain/foo.bar") when the file is not in the cache. The local system URL format will be device dependent.

As described above, caching metadata may be optionally provided and the requested file name does not have to already be in the cache control. However, in this case, the requested file is not automatically retrieved and normal cache loading procedures are applied to it. As a result, this method may return a network URL on one request and a file URL on a later request because the file has been loaded into the cache between those requests.

Cached files may be used by the application 302 associated with the peer communications framework control 404. The application may request the file data from the file cache manager component 424 as a binary stream or request the file location from the file cache manager component 424 and open it normally. Cached files are also available to the service provider component 410, which can then provide them to an external device such as an automobile head unit 102. In the present example, the binary stream method is used.

The cache control data that specifies the files and metadata used to maintain the cache may be generated on a client (e.g., the handheld communications device 104) or on a server within the server-based computer network 108 at runtime. How this data is generated may be as simple or as complex as needed and can change over time based upon needs of the application 302 or experience gained from tracking and monitoring types of files and actual use patterns of the application 302. The rules for caching applied on the server or the device (e.g., the handheld communications device 104) can be based on, but are not limited to, one or more of the following: files chosen by the application designers for likelihood of use or because they must be available on the device with a minimum time delay, files selected based on the current user's gestures (usage patterns), files selected based on aggregate user gestures, files selected based on user preferences, files selected based on the user's vehicle, files selected based on the user's current location, files selected based on the user's typical locations throughout the day, files selected based upon a partner or customer's requirements, files selected based on a connected device (e.g., the automobile head unit 102), and calling a service requesting the file in the future (e.g., the handheld communications device 104 service may update the server database as needed).

The initial implementation of the file selection process may be simple, adding complexity later as needs dictate. The handheld communications device client application (e.g., the service requester component 408) and the connected device (e.g., the automobile head unit 102) may request files from the cache which are not specified in the cache control data and those files will be cached normally after requested.

The service requester component 408 and service provider component 410 may each have corresponding client and server modules (e.g., HTTP client 412 and HTTP server 414 modules, respectively) to request and/or provide services via the peer network stack 306 or the general network stack 312 in order to support such requests and services coming from the application 302 and managed by the peer communications framework component 304. In one example embodiment, the peer network stack component 306 implements a minimal TCP/IP stack over appropriate serial data transport functionality. The data transport functionality may vary based upon the device and the peer communications framework control 404 configuration. The peer network stack 306 may, for example, include TCP functionality 416 at the transport layer, IP functionality 418 at the network layer, Serial Line Internet Protocol (SLIP) or Point to Point Protocol (PPP) functionality 420 at the data-link layer, and serial data transport functionality 422 such as Bluetooth® SPP or USB at the physical layer. For Bluetooth® SPP, the connection service name will use a specified value, for example "peer communications framework v1.0". The external device (e.g., the automobile head unit 102) may look for this value when enumerating the Bluetooth® profiles on the connecting device (e.g., the handheld communications device 104).

The service provider component 410 may be a minimal HTTP server with support for GET and POST semantics. Incoming HTTP requests resolve either to files in the file cache or to service requests, which are handled by native services of the peer communications framework control 304 or forwarded to the associated application 302 for servicing. Files may be requested using a specialized service native to the peer communications framework control 404 called "file" (e.g., http://168.100.10.1:80/file/filepath/filename.ext). Optional arguments can specify file-caching metadata, including the Internet URL the file is retrieved from. However, this is not an open proxy, as the Internet URL is subject to a match against cache control configuration options. Files may also be requested using an alias defined in the service configuration. In the present example, the file is requested using only the service name (e.g., "http://168.100.10.1:80/filealias"). Services may be requested by service name. (e.g., "http://168.100.10.1:80/servicename?foo=bar"). As the request may be in the form of an HTTP POST, it can include contents of any data type.

Services native to the peer communications framework control 404 are handled by the peer communications framework control 404 internally, after the application 302 is notified and given the option to abort the request. Application services are forwarded to the application 302 along with a "request" object that the application uses to determine the contents of the request and to respond to the request. The HTTP server 414 of the service provider component 410 may provide some services native to the service provider component 410. For example, these may include, but are not limited to, servicelist (which returns a list of available services using the same format as the service list in the configuration, filelist (which returns a list of available files, formatted as a service list), and file (which returns a file from the cache, adding it to the cache first if not already there). The service requester component 408 allows the application associated with the peer communications framework control 404 to make an HTTP request to the external peer device (e.g., the automobile head unit 102) using GET and POST semantics. Services are requested as defined by the external peer device and may be formed as HTTP GET or POST requests. For example, the request may be formed as "http://168.100.10.1:8080/servicename?foo=bar". To make the request, the application 302 gets a new request object from the peer communications framework control 404, sets its properties as needed and then calls the "send" method. The request object described above fires an event for success or for failure and the content of the response, if successful, is made available to the application 302 in the form of a binary stream.

Particular modules described above and other optional modules of the peer communications framework component 304 may or may not be present in other embodiments. However, excluding particular modules results in the device from which they are excluded not being able to act as an "anchor" device in the sense of being able to provide particular services to an external device that expects the full functionality of the peer communications framework component 304. For example, in the case of an external device (e.g., the automobile head unit 102) which has no connection to the Internet and therefore no need to cache and serve files, one can easily eliminate the file cache manager module 424 and the service provider component 410 (unless the particular external device needs to provide services other than cached files from the Internet).

Of the two peers participating in a connection between the "anchor" and external device as described above, only one need implement functionality of the peer communications framework component 304. The other peer may connect using any standards-compliant network stack with an appropriate data transport. For example, the automobile head unit 102 with a general network stack 308 and support for SLIP over Bluetooth® SPP (the external device) can connect to the handheld communications device 104 running the peer communications framework component 304 (the "anchor"). Each peer (e.g., the handheld communications device 104 and the automobile head unit 102) provides an appropriate data transport and a network stack capable of communicating via the appropriate network addresses, along with the protocol support required to make and handle service requests. Peers are provided this functionality by a peer communications framework component 304 library. Peers that do not have a peer communications framework component 304 implement this functionality separately. For example, this particular functionality may include data transport functionality (Bluetooth® SPP/SLIP or others), TCP/IP functionality, HTTP client functionality (to request services from the "anchor" peer), and other optional protocols. For example, peers that do not have a peer communications framework component (e.g., the automobile head unit 102) may optionally provide an HTTP server to act as a service provider to the "anchor" peer (e.g., the handheld communications device 104).

When two peers connect, one or more peers may receive information indicating that they are participating in a peer-to-peer network wherein one peer has a peer communications framework component 304 so they can configure themselves appropriately. The "anchor" peer is the peer that has the peer communications framework component 304 and will already be configured appropriately. However, the external peer may support other kinds of connections over the same physical serial transport and may learn what kind of connection has been initiated by the external peer looking for the value of the connection service name as described above.

Figure 4B:
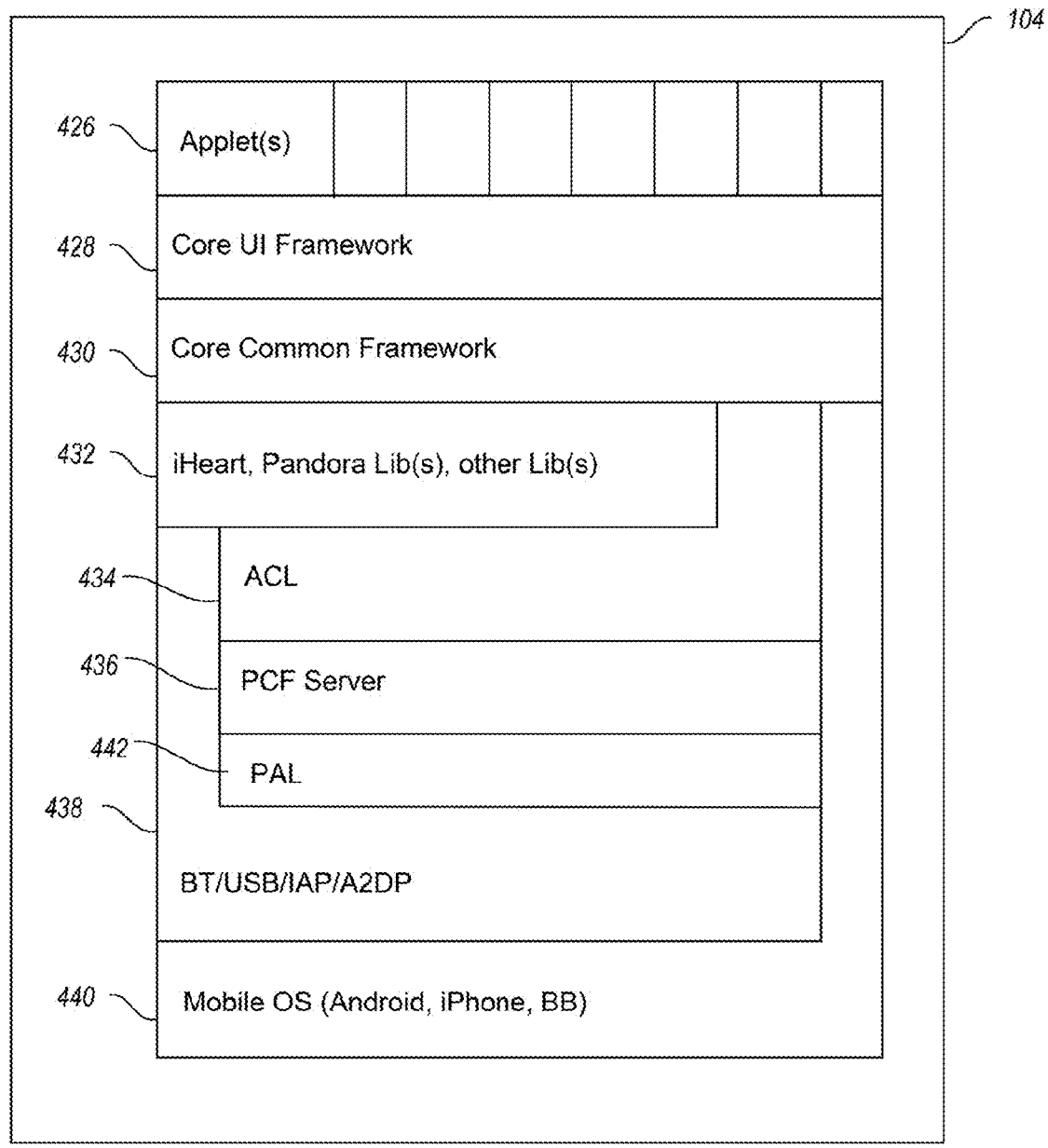
FIG. 4B is a schematic diagram, according to another illustrated embodiment, showing software modules of the handheld communications device.

FIG. 4B is a schematic diagram, according to another illustrated embodiment, showing software modules of the handheld communications device 104. Shown is a relatively hierarchical layering of various software components that may communicate with each other through applicable application programming interface (API) calls. The Applet(s) layer 426 is at the top, and may include various high level applications available for download onto the handheld device 104. The core user interface framework layer 428 is shown, then the core common framework layer 430, the various libraries 432 for media players, etc., an access control layer 434, a peer communication framework server 436, a physical access layer (PAL) 442, a bluetooth, etc. connection interface layer 438, and lastly the handheld device operating system layer 440 is shown at the bottom.

Figure 5:
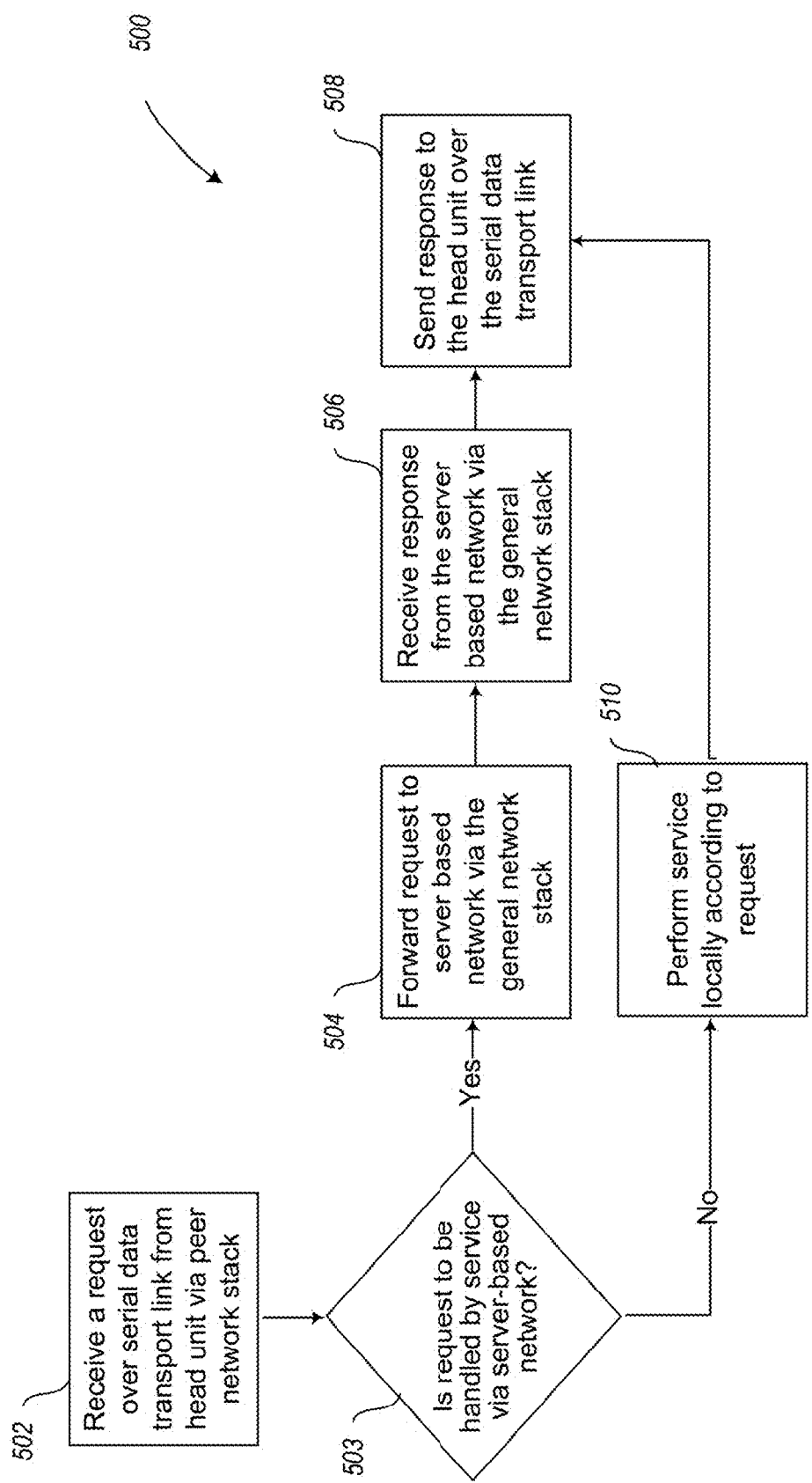
FIG. 5 is a flow diagram showing a method of providing communications between an automobile head unit, a handheld communications device, and a server-based computer network via which Internet access is provided, according to one illustrated embodiment.

FIG. 5 is a flow diagram showing a method 500 of providing communications between an automobile head unit of an automobile, a communications device, and a server-based computer network via which Internet access is provided, according to one illustrated embodiment.

The method starts at 502, in which a request may be received over a serial data transport link from the automobile head unit 102 via a peer-to-peer network stack. At 503 it may be determined whether the request is to be handled by a service via an external server-based network. For example, some services are available native to (i.e., locally on) the handheld communications device and others may be available via a server-based network external to the handheld communications device. An example of such a service that may be available locally on the handheld communications device may be one that changes the station on an Internet radio application. However, this determination of whether the request is to be handled by a service via an external server-based network would not be needed if all services were available natively on the handheld communications device or if no services were available natively on the handheld communications device and embodiments including such various processes and systems excluding such a decision are contemplated. If it is determined that the request is to be handled by a service via an external server-based network, then at 504 the request is forwarded to a server-based computer network via the general network stack of the device. At 506, the response is received from the server-based computer network via the general network stack and at 508 the response is sent to the automobile head unit over the serial data transport link. In one embodiment, the serial data transport link between the head unit and the communications device is either a Bluetooth®

Serial Port Profile (SPP) type serial data transport link or Universal Serial Bus (USB) type serial data transport link.

If it is determined at 503 that the request is not to be handled by a service via an external server-based network, then at 510 the service is performed locally according to the request. For example, the service may be performed locally on the handheld communications device. At 508, the response resulting from the performance of the service is then sent to the automobile head unit over the serial data transport link. For example, in the case of the service being one that changes the station on an Internet radio application, the radio Internet station would be changed using a service locally on the handheld communications device without forwarding the request to an external network.

Figure 6:
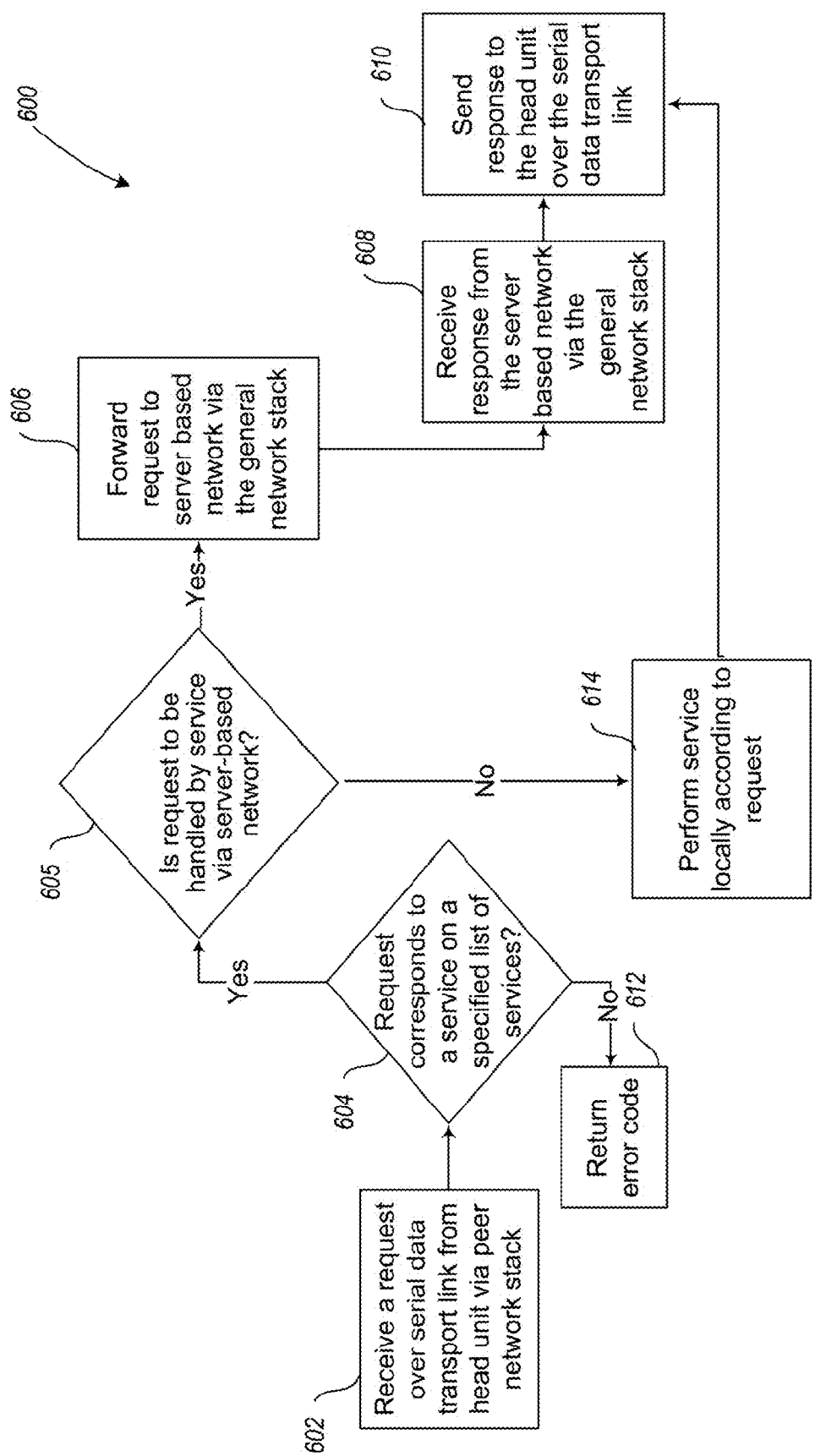
FIG. 6 is a flow diagram showing a method of providing communications between an automobile head unit, a communications device having a handheld form factor and a server-based computer network, including filtering service requests, according to one illustrated embodiment.

FIG. 6 is a flow diagram showing a method of providing communications between an automobile head unit, a communications device and a server-based computer network, including filtering service requests, according to one illustrated embodiment.

The method starts at 602, in which a request is received over serial data transport link from an automobile head unit via a peer-to-peer network stack. At 604 it may be determined whether the request corresponds to a service on a specified list of services. For example, the specified list of services may be a list of services available via a peer other than the automobile head unit (e.g., a handheld communications device). If it is determined that the request does not correspond to a service on the specified list of services, the method may then return an error code 612 (e.g., return an HTTP error code to a client requesting the service). At 606, if it had been determined that the request corresponds to a service on the specified list of services, then at 605 it may be determined whether the request is to be handled by a service via an external server-based network. For example, some services are available native to (i.e., locally on) the handheld communications device and others may be available via a server-based network external to the handheld communications device. An example of such a service that may be available locally on the handheld communications device may be one that changes the station on an Internet radio application. However, this determination of whether the request is to be handled by a service via an external server-based network would not be needed if all services were available natively on the handheld communications device or if no services were available natively on the handheld communications device and embodiments including such various processes and systems excluding such a decision are contemplated. If it is determined that the request is to be handled by a service via an external server-based network, then at 606 the request may be forwarded to a server-based computer network via a general network stack. For example, the general network stack resides on the same device (e.g., the communications device) on which the peer-to-peer network stack resides. At 608 a response is received from the server-based computer network via the general network stack. At 610, the response may then be sent to the automobile head unit over the serial data transport link.

If it is determined at 604 that the request is not to be handled by a service via an external server-based network, then at 614 the service is performed locally according to the request. For example, the service may be performed locally on the handheld communications device. At 614, the response resulting from the performance of the service is then sent to the automobile head unit over the serial data transport link. For example, in the case of the service being one that changes the station on an Internet radio application, the radio Internet station would be changed using a service locally on the handheld communications device without forwarding the request to an external network.

Figure 7:
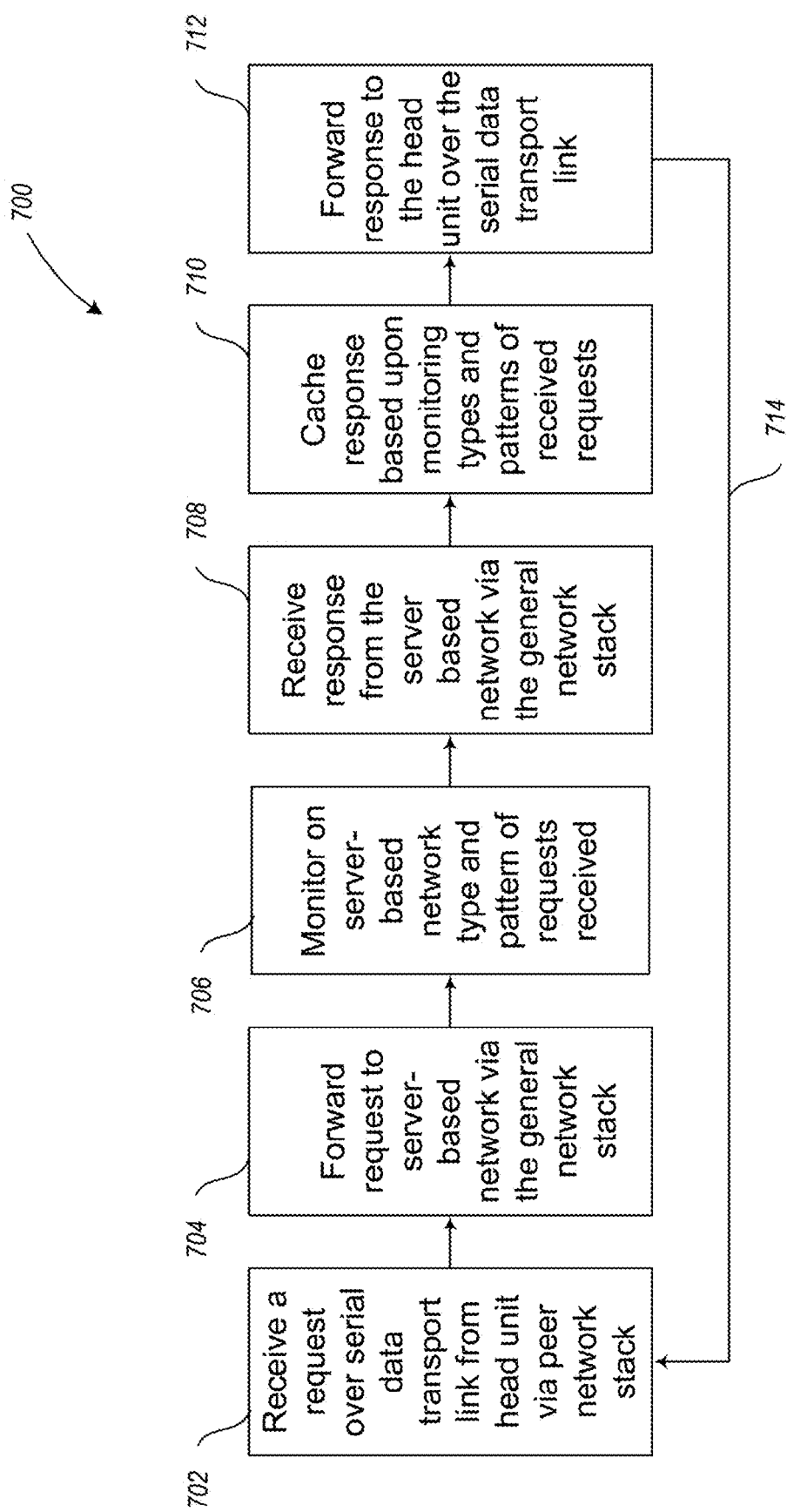
FIG. 7 is a flow diagram showing a method of providing communications between an automobile head unit, a communications having a handheld form factor device and a server-based computer network, including intelligent caching, according to one illustrated embodiment.

FIG. 7 is a flow diagram showing a method of providing communications between an automobile head unit, a communications device and a server-based computer network, including intelligent caching, according to one illustrated embodiment.

The method starts at 702, in which a request is received over a serial data transport link from the automobile head unit via a peer-to-peer network stack. For example the request may be received at the communications device on the peer network having a peer-to-peer connection with the automobile head unit. At 704, the request is forwarded to a server-based computer network via a general network stack. For example, the general network stack resides on the same device (e.g., the communications device) on which the peer-to-peer network stack resides. At 706, types and patterns of requests received are monitored. For example, this monitoring is performed on one or more servers on the server-based computer network but, optionally, may also or instead be performed locally on the communications device. At 708, a response is received from the server-based computer network via the general network stack. At 710 the response (or at least a portion of the response) may be cached based upon the monitoring types and patterns of the received requests. For example, the response may be received and at least a portion of the response cached on the communications device according to various caching data received from the server-based computer network indicating what files or responses to cache on the communications device. The method may then repeat 714 starting at 702 as more requests are received.

Figure 8:
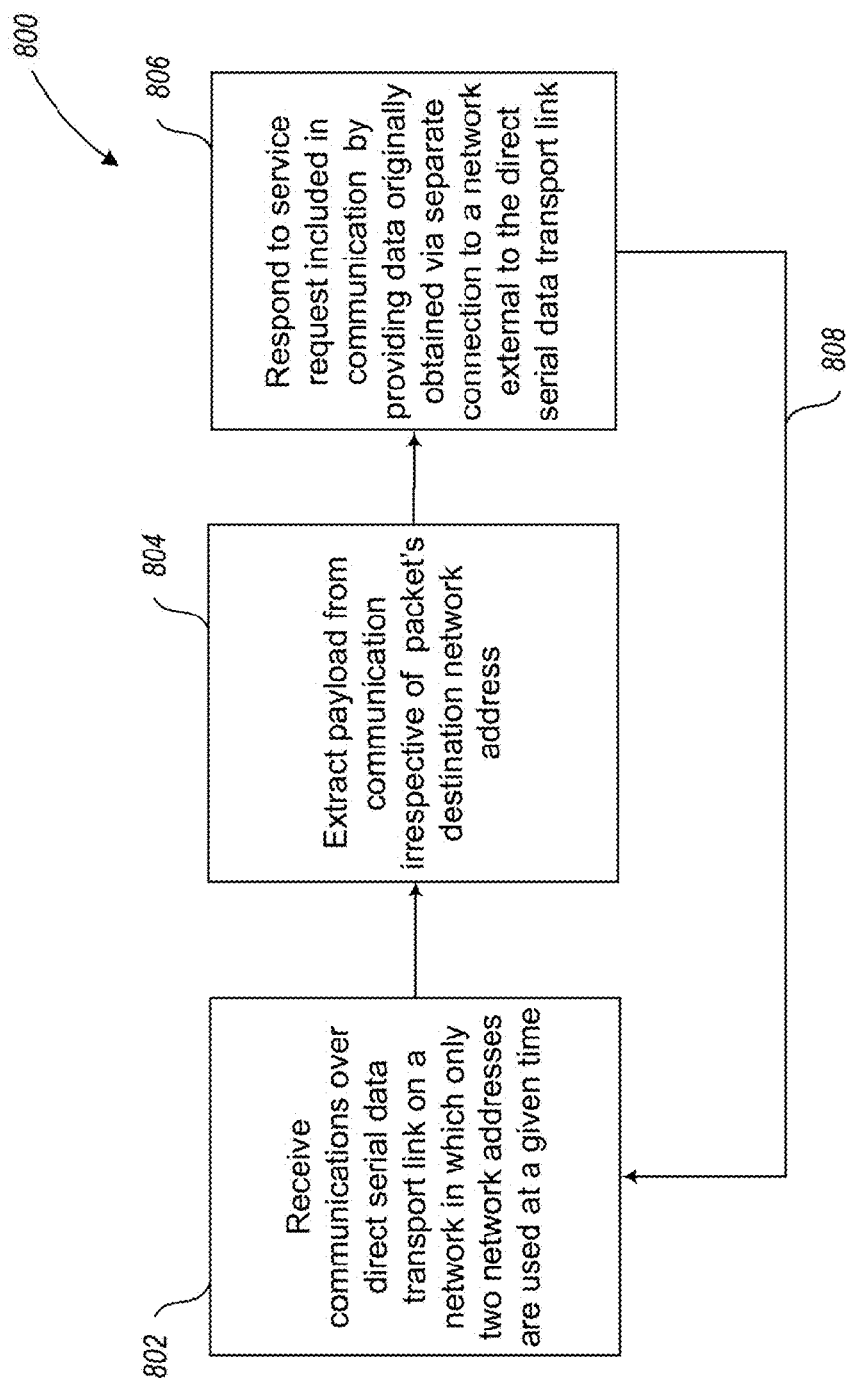
FIG. 8 is a flow diagram showing a method for communicating in a communication network environment between a first and a second network peer over a direct serial data transport link including responding by the first network peer to a service request included in one or more of the communications, according to one illustrated embodiment.

FIG. 8 is a flow diagram showing a method 800 for communicating in a communication network environment between a first and a second network peer over a direct serial data transport link including responding by the first network peer to a service request included in one or more of the communications, according to one illustrated embodiment.

The method starts at 802, in which communications are received over a direct serial data transport link on a network in which only two network addresses are used at a given time. There may be an established data transport connection between the first network peer and the second network peer over the direct serial data transport link and the first network peer may have a separate connection over a separate network interface to a network external to the link. At 804, a payload is extracted from a communication received irrespective of the communication packet's destination network address. For example, the destination network address may be ignored or otherwise not used. Also, the established data transport connection between the first network peer and the second network peer on the direct serial data transport link may be one in which resolution of network addresses of the first network peer and the second network peer to hardware addresses of the first network peer and the second network peer is not necessary for the responding by the first network peer to the service request. At 806 a service request included in the communication is responded to by providing data that was originally obtained via the separate connection to a network external to the direct serial data transport link. For example, the network external to the direct serial data transport link may be the Internet. The method may then repeat 808 starting at 802 as more communications are received.

Figure 9:
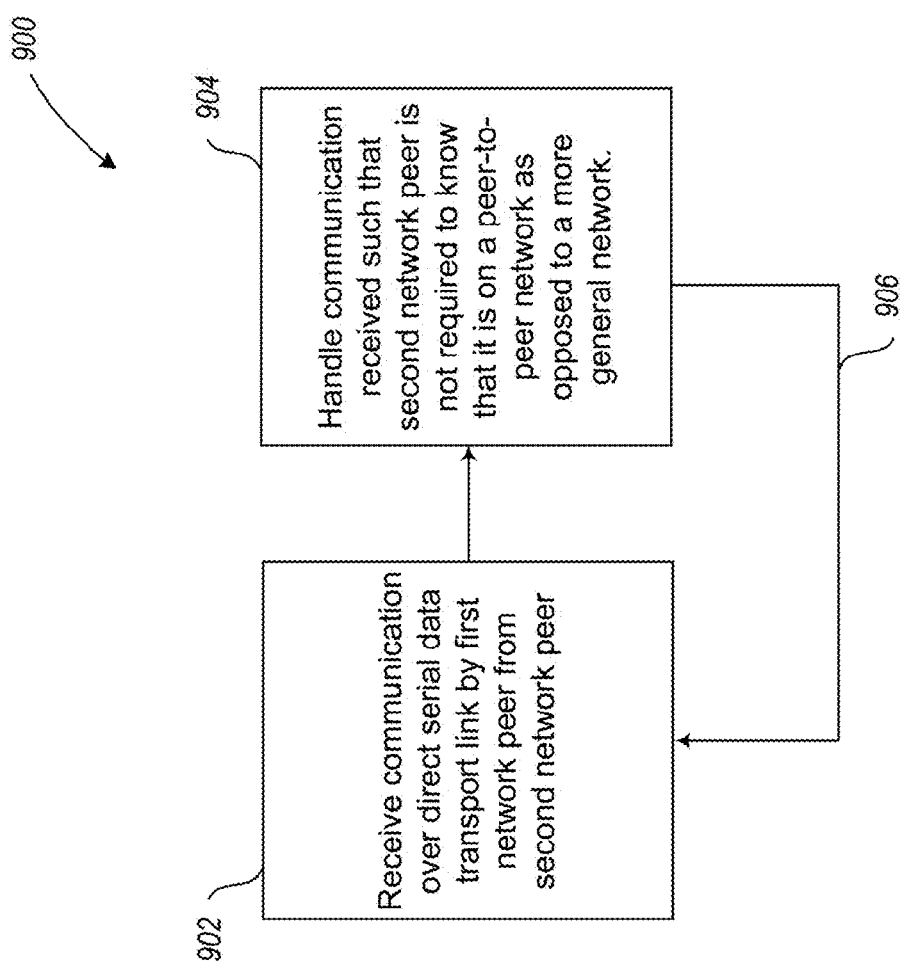
FIG. 9 is a flow diagram showing a method for communicating in a communication network environment between a first and a second network peer over a direct serial data transport including handling the communications received which have requests for particular network services, according to one illustrated embodiment.

FIG. 9 is a flow diagram showing a method 900 for communicating in a communication network environment between a first and a second network peer over a direct serial data transport including handling the communications received which have requests for particular network services, according to one illustrated embodiment.

The method starts at 902, in which a communication is received over a direct serial data transport link by a first network peer from second network peer. At 904, the communication received is then handled such that the second network peer is not required to know that it is on a peer-to-peer network as opposed to a more general network in order. The second network peer is enabled to handle network communications in a same manner as if the first network peer did provide particular general network services, even if the first network peer does not provide the requested network service. A corresponding response from the first network peer will handle a service request in the communication in an appropriate manner according to the particular network protocol (e.g., TCP/IP) to enable further communications between the first and second network peer without interrupting the connection. For example, if the first network peer does not provide services such as Dynamic Host Configuration Protocol (DHCP) or Address Resolution Protocol (ARP), requests for such services will be ignored or otherwise responded to in a manner enabling the requester to continue communications in a normal manner without interrupting the current network connection or session. The method may then repeat 906 starting at 902 as more communications are received.

Figure 10:
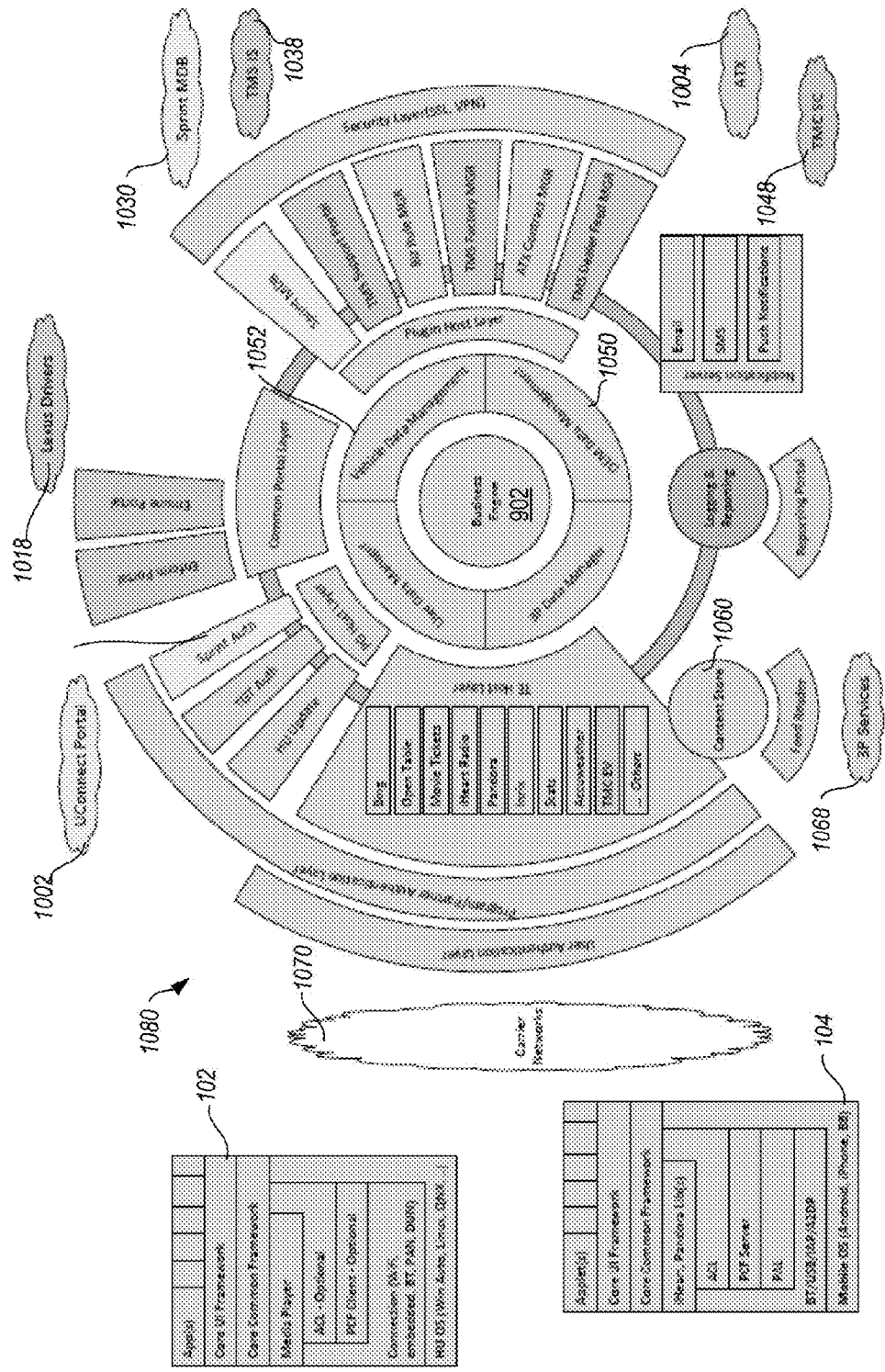
FIG. 10 is a system architecture diagram according to one illustrated embodiment, of various logical components of the system for providing services and communications involving automobile head units.

FIG. 10 is a system architecture diagram according to one illustrated embodiment, of various logical components of the system for providing services and communications involving automobile head units.

Shown are the handheld device 104 and the head unit 104 in communication with a main service provider 1080 along with other service providers 1002, 1018, 1030, 1038, 1004 and 1048 over various communication system carrier networks 1070. The main service provider 1080 provides services to the head unit 104 and the handheld device 102, such as streaming music, news, sports, weather, travel, warning system information, maps, navigational, information, etc., and other entertainment and informational data services. A user of the handheld device 104 and/or the head unit 102 may be associated with an account serviced and managed by the main service provider 1080 such that their information and personal preferences may be stored, follow them and be accessible on or via their handheld device 102 and/or their head unit 104, or any head unit (e.g., head unit 120) that is configured to communicate with the other devices and the main service provider 1080. The vehicle identification number (VIN) of their automobile may also be associated with the head unit 102 and the user's account. In this manner the user and their devices may be automatically authenticated when sending service requests to the main service provider 1080 or to each other without the user having to manually provide credential information each time. As an example, the table below sets out many technical features which are implemented in many embodiments within the systems described herein. "TGT" as used herein also refers to the main service provider.

TABLE 1

| Feature | |
|---|---|
| Personalization (preferences follow the users device) | The system allows for the users preferences and setting to follow them as they move from one vehicle to another via the user's mobile device |
| local POI storage | The system allows the user to store points of interest on their mobile device that can be shared with the vehicle upon pairing. |
| local preferences storage | |
| Configuring head unit (HU) when device is paired with the car | |
| Auto preference sync with HU | |
| Ability for HU to pull down background image and other preferences from cloud or mobile handset | |
| ACL (Authentication and Control Logic) | The ACL is the metadata data packet generated by our servers. Connected Service application on HS provides service level access to connected peer device. Service can be defined as particular or bundle of feature/functionality that can be configured independently based on user privileges, connected Vehicle, user HS device capability etc. User subscribe/unsubscribe these services using TGT web portal. Service information is pulled by HS application from server in the form of ACL (Authentication and Control Logic/Access Control List) to serves following purpose. 1) Provides information to HS application about services availability so that it can enable and disable HMI access to services. 2) Filter service request based on ACL and provided appropriate response message to connected device to display HMI. 3) this enables TGT system to give access to any services for limited time for user try the service before subscribing to it etc. |

TABLE 1-continued

| Feature | |
|---|---|
| Content Filtering/ Restriction | The system restricts access to urls and data types that are outside the program and can be managed and modified as the program evolves. This is a critical component in distinguishing our solution from a tethering solution |
| Applet Management | The system can expose a unique set of applets on the user's handset based on the user's vehicles and preferences. |
| Custom Error Messaging | The system has the ability to tailor error messages to the user's specific situation based on their account, vehicles, HS device and subscription status. Linked accounts and preferences and then host these error messages on the users handset.<br>Example:<br>1) If particular user has subscribed to internet radio service so service information is present in the service list but the device in use does not support playback of internet radio. It should be able to inform user that device is not capable to support this service.<br>2) If a service is present in the list but is expired for particular user although device is capable of supporting the service. It should be able to inform user that service is expired. |
| Content Compression | Mobile communication compression between handset and cloud |
| Mobile web server over USB/RFCOM | The system supports the communication from various vehicle head units to a server hosted by the user's mobile device. Send to car. Parking lot app. Protected vehicle to phone network to avoid user and vehicle data going to the cloud. |
| Mobile service handlers (servlets) | The system has the ability to extend the handset app to support personalized information from the HS and adding 3rd party services and code modules such as Pandora command and control library, mDest... |
| Generic interface for any type of service communication with mobile handset | |
| User Management (Credential Injection) | The system has the ability to inject user credentials based on service type, via the mobile phone application, into requests coming out of the vehicle head unit before forwarding to internet. This prevents the user from storing sensitive data in the car and allows other users to bring their preferred experience into the car with them. This also allows the user to move from one car to another without having to log in with local credentials. |
| Logging (HU and HS) for Automotive Usage | The system has the ability to log usage of each service request from connected headunit. This enables TGT system<br>1) To provide summary data to our customers on their customer's behavior.<br>2) Helps TGT monitor service attacks or any misuse of TGT system<br>3) Helps in providing better customer support by analyzing service usage and logs. |
| Multiple concurrent connections (5 blades) | The system allows for multiple concurrent connections through the mobile application. This allows for such situations as; a user can search for a POI while listening to internet radio and receive a traffic warning. |
| Access to HS file Sys | Ability to access the file system mobile HS's file system using standard network files system protocols from the HU |
| Web Service Redirect | The system allows the mobile phone to redirect specific Head unit requests. This mechanism can allow fixes to vehicle service requests by updated the mobile handset application to avoid expensive recalls. |
| Mobile web proxy server | The system Allows for http traffic to be routed through mobile handset when appropriate for the HU request. |
| Mobile web proxy server | The system supports the communication from various vehicle head units through a singular set of mobile applications. |
| Mobile file cache | |
| Mobile device file storage | |
| Mobile File System | |
| Mobile File System Cloud Sync | |

TABLE 1-continued

| Feature | |
|---|---|
| (allowing for specific files to be synced to the cloud for backup and multi-device usage) | |
| Generic audio library communication gateway | The system allows for multiple audio libraries using proprietary protocols to communicate with wide array of automotive head unit's (HU's) (Pandora and iHeart) The system provides various mechanism to play to music based on capability on connected device (HU and HS). headunit which support various audio codecs can streaming music directly to HU via PCF link and decode stream on headunit. Headunit which does not support required codecs can use command and control mechanism to stream and decode music on connected HS. These mechanism covers vast range of music streaming options to user and user is able to select one or multiple music/internet radio provider of their choice. |
| Mobile socks proxy server over BlueTooth/USB Central App communicating to other Mobile Apps | Allowing for socket traffic to be authenticated and routed through mobile handset when appropriate for HU request over TCP protocol |
| User Bandwidth monitoring to help manage user account | |
| DD - HS app lockdown while connected to HU | The system also consider user driving safety by locking down the usage of HS application when HU is connected with the HS application. It also provide option to disconnect application from HU, if user require to use the Hs application. |
| HS phone HW lockdown based on SPP connection to HUs | requires working with carriers |
| Intelligent location (GPS) acquisition and battery life extender | Mobile handsets intelligently determine which mode of location should be used based on the applications accuracy requirements and the environment the device is in during the acquisition Mobile handset application will reuse cashed location in conditions relevant for the application based on time and rate of change. Allowing for improved battery life and accuracy when GPS fix is not available |
| Rapid configuration management in production builds | Mobile applications have secure mechanism to change the configuration of release product for rapid test and automation without having to rebuild the application code. Allowing the application to be directed to specific test server for specific handset and test run. When the application is in production this can't be achieved because of the asymmetric encryption algorithm mused in the communication. Companion application is installed allowing for QA engineer to test the same production bits on multiple servers prior to deployment |
| Dynamic forced update of the mobile handset upon detection of connected automotive head unit compatibility | |
| Multi Media services which are purchased for a car can roam with user to any car supporting those services, even with different UIs abstracting of input not just output (e.g., voice) | |
| Error condition partition. Track and monitor error classes to manage SLA | |

TABLE 1-continued

| Feature | |
|---|---|
| Ability to send custom errors based on explicit backend scenarios VIN specific Services can be tied to the VIN VIN reconciliation to user without definitive identifier of the VIN (meaning HU doesn't send up VIN allowing the system to tie VIN to user) | |
| Abuse detection and mitigation | the system has the ability to restrict and correct programmatically who can access services for a vehicle. |
| DIR (Device Interoperability Repository) Dynamic Virtual device type building - for future device compatibility matrix OTA HU software update - generically for any type of HU on the market | |
| Insulate automotive ecosystem from volatile $3^{rd}$ party services | The system has the ability to manipulate 3rd party content to maintain the data constancy for downstream devices. This means that a 10 year vehicle can maintain changing services without having to be updated |
| Ability to transform content to multiple formats based on the callers supported format (XML, JSON, SPEEK, etc.) | The system has the ability to modify 3rd party content to align with the capabilities of the receiving client device |
| Self-service/Self Correcting infotainment management (Conflict) LBS (corridor route search based on user location direction and speed) | |
| $3^{rd}$ party cred management from the server (service enablement via federation) | The system can link 3rd party credentials to a local user identity to validate and provide user context to the system. |
| Clients (HS and HU do not need to be credential aware) | The system can manage the facilitation of a request to a 3rd party without supplying the 3rd party credentials to the client. |
| movie, OT, Facebook Intelligent Ownership Management - Location - car and driver Barcode reader - key in hand/door open Web service headers - paired to the car Guest Driver Management | |
| TE logging | The system has the ability to track service usage through calls to our services from any client. Metrics can be gathered to determine client HW and OS versions as well as frequency from those devices. |

TABLE 1-continued

Feature

Figure 11:
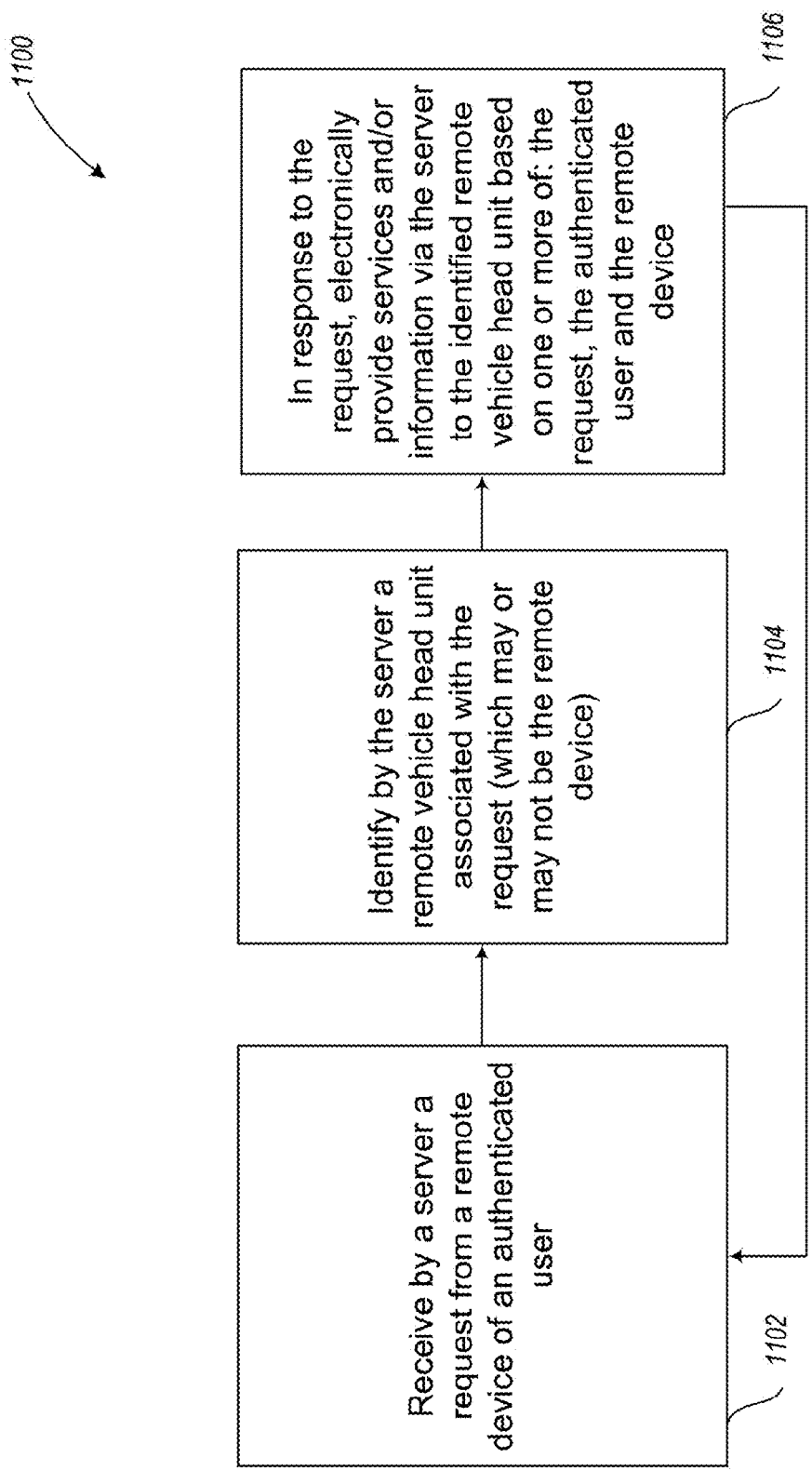
FIG. 11 is a system flow diagram showing a method of providing services and/or information via the server to the identified remote vehicle head unit, according to one illustrated embodiment.

On device test
automation
framework
Ability to control the
UI on automotive
HU from backend
script
Ability to capture
results from HU UI
automation FIG. 11 is a system flow diagram showing a method 1100 of providing services and/or information via the server to the identified remote vehicle head unit 102, according to one illustrated embodiment.

The method starts at 1102, at which a server receives a request from a remote device of an authenticated user.

At 1104 the server identifies a remote vehicle head unit associated with the request (which may or may not be the remote device).

At 1106, in response to the request, the server electronically provides services and/or information via the server to the identified remote vehicle head unit based on one or more of: the request, the authenticated user and the remote device.

Figure 12:
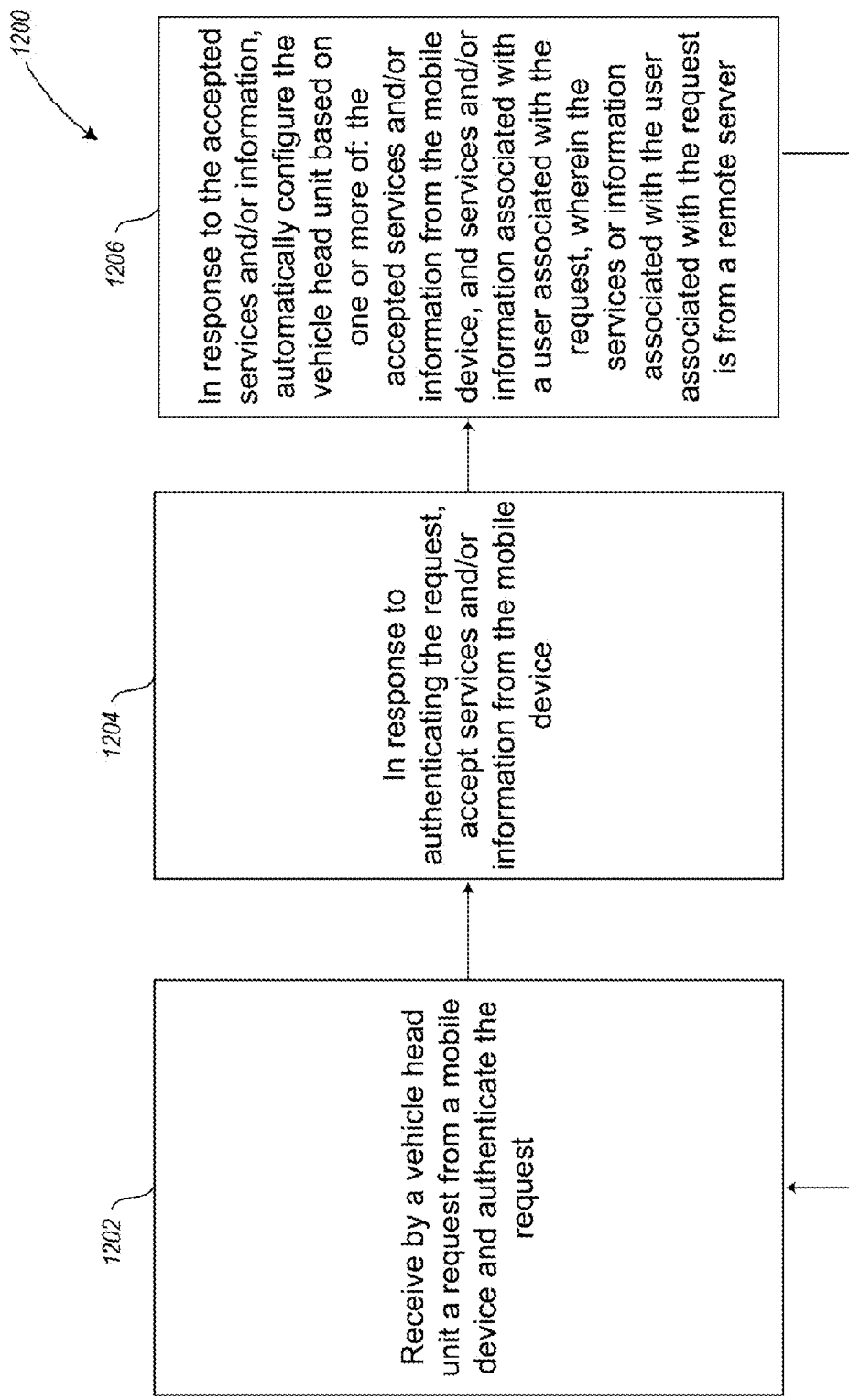
FIG. 12 is a system flow diagram showing a method of automatically configuring a vehicle head unit based on received information, according to one illustrated embodiment.

FIG. 12 is a system flow diagram showing a method 1200 of automatically configuring a vehicle head unit based on received information, according to one illustrated embodiment.

At 1202, a vehicle head unit receives a request from a mobile device and authenticates the request.

At 1204, in response to authenticating the request, the head unit accepts services and/or information from the mobile device.

At 1206, in response to the accepted services and/or information, the head unit automatically configures the vehicle head unit based on one or more of: the accepted services and/or information from the mobile device, and services and/or information associated with a user associated with the request, wherein the services or information associated with the user associated with the request is from a remote server.

Figure 13:
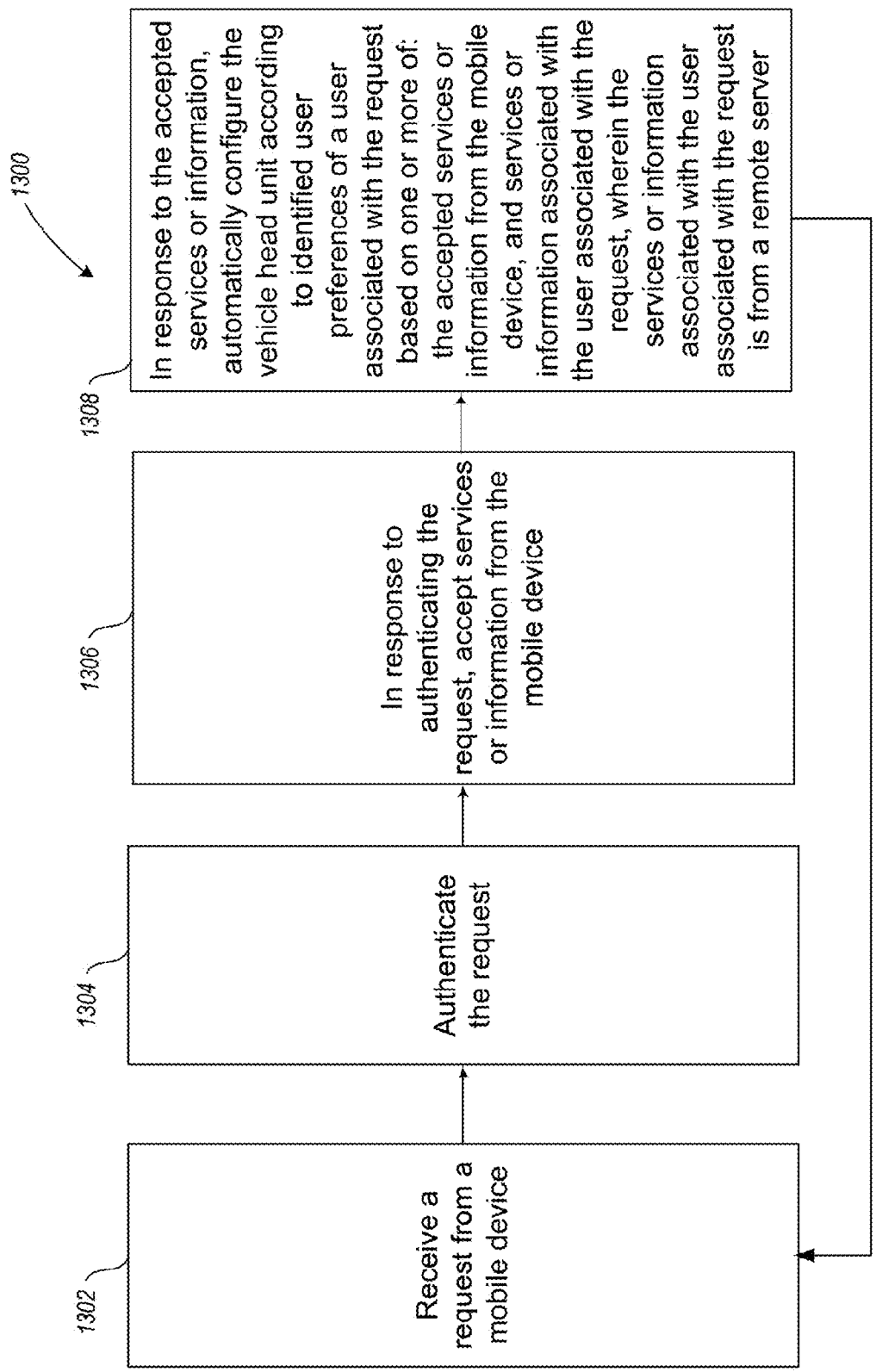
FIG. 13 is a system flow diagram showing a method of automatically configuring a vehicle head unit based on automatically configuring the vehicle head unit according to identified user preferences, according to one illustrated embodiment.

FIG. 13 is a system flow diagram showing a method 1300 of automatically configuring a vehicle head unit based on automatically configuring the vehicle head unit according to identified user preferences, according to one illustrated embodiment.

At 1302, the head unit receives a request from a mobile device.

At 1304, the head unit authenticates the request.

At 1306, in response to authenticating the request, the head unit accepts services or information from the mobile device.

At 1308, in response to the accepted services or information, the head unit automatically configures the head unit according to identified user preferences of a user associated with the request based on one or more of: the accepted services or information from the mobile device, and services or information associated with the user associated with the request, wherein the services or information associated with the user associated with the request is from a remote server.

Figure 14:
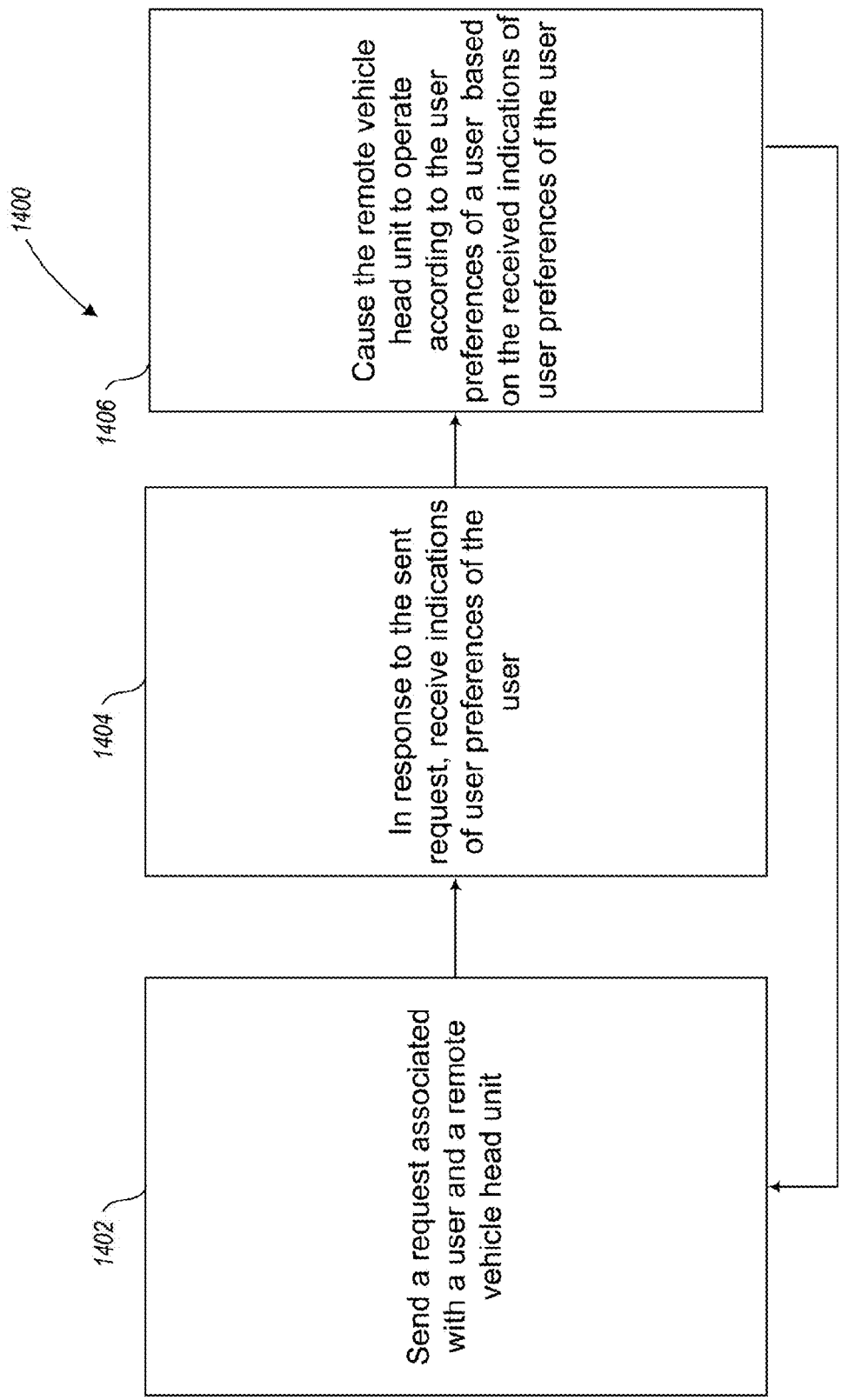
FIG. 14 is a system flow diagram showing a method of automatically causing a vehicle head unit to operate according to the user preferences of a user, according to one illustrated embodiment.

FIG. 14 is a system flow diagram showing a method 1400 of automatically causing a vehicle head unit to operate according to the user preferences of a user, according to one illustrated embodiment.

At 1402, the handheld device sends a request associated with a user and a remote vehicle head unit.

At 1404, in response to the sent request, the handheld device receives indications of user preferences of the user.

At 1406, the handheld device causes the remote vehicle head unit to operate according to the user preferences of a user based on the received indications of user preferences of the user. Also, the same or similar method 1400 may apply in which a server of a service provide is performing the steps.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other devices, not necessarily the exemplary automobile head unit 102 and handheld communications device 104 generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. Those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors), as firmware, or as virtually any combination thereof, and that designing the circuitry and/or writing the code for the software and or firmware would be well within the skill of one of ordinary skill in the art in light of the teachings of this disclosure.

When logic is implemented as software or firmware and stored in memory, logic or information can be stored on any computer-readable medium (i.e., processor-readable storage medium) for use by or in connection with any processor-related system or method. In the context of this disclosure, a memory is a computer-readable medium that is an electronic, magnetic, optical, or other physical device or means that contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" or "processor-readable storage medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A computer-implemented method, comprising:
    receiving, by at least one processor of a server, information regarding a head unit of an automobile;
    receiving, by the at least one processor of the server, information regarding a communications device associated with the head unit of the automobile;
    uniquely identifying, by the at least one processor of the server, the head unit based at least in part on the received information and other previously stored information regarding the head unit and communications device; and
    providing, by the at least one processor of the server and based at least in part on a vehicle identification number (VIN) associated with the uniquely identified head unit, one or more services to one or more of the uniquely identified head unit and the associated communications device.

2. The computer-implemented method of claim 1 wherein the providing of the one or more services includes:
    providing, by the at least one processor of the server, multimedia services for a user associated with the one or more of the uniquely identified head unit and the communications device that can roam with the user to other automobiles with a capability to support the multimedia services by authenticating, by the at least one processor of the server, the user via the one or more of the uniquely identified head unit and the communications device.

3. The computer-implemented method of claim 1 wherein the providing of the one or more services includes:
    abstracting, by the at least one processor of the server, of user input to the one or more of the uniquely identified head unit and the communications device.

4. The computer-implemented method of claim 1 wherein the providing of the one or more services includes:
    tracking or monitoring, by the at least one processor of the server, error classes associated with the one or more of the uniquely identified head unit and the associated communications device.

5. The computer-implemented method of claim 1 wherein the providing of the one or more services to the one or more of the uniquely identified head unit and the associated communications device based on the vehicle identification number (VIN) does not require the VIN to be associated with any user.

6. The computer-implemented method of claim 1 wherein the method further includes providing, by the at least one processor of the server, services to detect and mitigate abuse of the server.

7. The computer-implemented method of claim 1 wherein the method further includes providing, by the at least one processor of the server, a repository of information regarding devices that are interoperable.

8. The computer-implemented method of claim 1 wherein the method further includes providing, by the at least one processor of the server, a virtual device that having dynamic features to facilitate building a device compatibility matrix.

9. The computer-implemented method of claim 1 wherein the providing of the one or more services includes:
    providing, by the at least one processor of the server, software updates to the uniquely identified head unit.

10. The computer-implemented method of claim 1 wherein the providing of the one or more services includes:
    manipulating, by the at least one processor of the server, content to be provided to the one or more of the uniquely identified head unit and the associated communications device to maintain compatibility of the one or more of the uniquely identified head unit and the associated communications device with the content.

11. The computer-implemented method of claim 1 wherein the providing of the one or more services includes:
    transforming, by the at least one processor of the server, content to be provided to the one or more of the uniquely identified head unit and the communications device to a one or more formats based on one or more supported formats of the one or more of the uniquely identified head unit and the communications device.

12. The computer-implemented method of claim 1 wherein the providing of the one or more services includes:
    searching, by the at least one processor of the server, for the one or more of the uniquely identified head unit and the communications device, based on one or more of location, direction and speed of the one or more of the uniquely identified head unit and the communications device; and
    providing, by the at least one processor of the server, location information based on the searching.

13. The computer-implemented method of claim 1 wherein the providing of the one or more services includes:
    linking, by the at least one processor of the server, third party credentials to a user identity associated with the one or more of the uniquely identified head unit and the communications device.

14. The computer-implemented method of claim 1 wherein the providing of the one or more services includes:
- receiving a request for service from the one or more of the uniquely identified head unit and the associated communications device to be provided by a third party service provider;
- responding to the request obtaining the service from the third party and facilitating providing the requested service to without supplying credentials of the third party service provider to the one or more of the uniquely identified head unit and the associated communications device or a user associated with the one or more of the uniquely identified head unit and the associated communications device.

15. A server for providing services to one or more remote head units of automobiles and one or more remote communications devices having a handheld form factor that are associated with the one or more head units comprising:
- at least one processor; and
- a non-transitory computer readable medium coupled to the at least one processor and having computer-executable instructions stored thereon that, when executed, cause the at least one processor to:
  - receive information regarding a head unit of an automobile;
  - receive information regarding a communications device associated with the head unit of the automobile;
  - uniquely identify the head unit based at least in part on the received information and other previously stored information regarding the head unit and communications device, wherein the previously stored information includes a vehicle identification number (VIN) associated with the uniquely identified head unit; and
  - based at least in part on the identifying of the head unit, provide services to manage ownership information of the automobile associated with the uniquely identified head unit.

16. The server of claim 15 wherein the computer-executable instructions, when executed, further cause the at least one processor to:
- provide location services regarding current location of the one or more of the uniquely identified head unit and the communications device associated with the uniquely identified head unit.

17. The server of claim 15 wherein the computer-executable instructions, when executed, further cause the at least one processor to:
- provide services regarding using barcode data for authentication.

18. The server of claim 15 wherein the computer-executable instructions, when executed, further cause the at least one processor to:
- provide services regarding management of and authentication of guest users associated with the one or more of the uniquely identified head unit and the communications device associated with the uniquely identified head unit.

19. The server of claim 15 wherein the computer-executable instructions, when executed, further cause the at least one processor to:
- track usage of services provided to users associated with the one or more remote head units of the automobiles.

20. A non-transitory computer readable storage medium, having computer executable instructions thereon that, when executed, cause at least one processor of a server to:
- receive information regarding a head unit of an automobile;
- receive information regarding a communications device associated with the head unit of the automobile;
- uniquely identify the head unit based at least in part on the received information and other previously stored information regarding the head unit and communications device; and
- provide services to one or more of the uniquely identified head unit and the associated communications device based on the unique identification of the head unit, wherein the providing of the one or more services includes providing the one or more services based at least in part on a vehicle identification number (VIN) associated with the uniquely identified head unit.

21. The non-transitory computer readable storage medium of claim 20 wherein the providing of the one or more services includes:
- providing multimedia services for a user associated with the one or more of the uniquely identified head unit and the communications device that can roam with the user to other automobiles with a capability to support the multimedia services by authenticating, by the at least one processor of the server, the user via the one or more of the uniquely identified head unit and the communications device.

22. The non-transitory computer readable storage medium of claim 20 wherein the providing of the one or more services includes:
- abstracting of user input to the one or more of the uniquely identified head unit and the communications device.

23. The non-transitory computer readable storage medium of claim 20 wherein the providing of the one or more services includes:
- tracking or monitoring, by the at least one processor of the server, error classes associated with the one or more of the uniquely identified head unit and the associated communications device.

24. The non-transitory computer readable storage medium of claim 20 wherein the providing of the one or more services based on the vehicle identification number (VIN) does not require the VIN to be associated with any user.

25. The non-transitory computer readable storage medium of claim 20 wherein the computer executable instructions, when executed, further cause the at least one processor of the server to provide services to detect and mitigate abuse of the server.

* * * * *

UNITED STATES PATENT AND TRADEMARK OFFICE
CERTIFICATE OF CORRECTION

PATENT NO. : 8,799,360 B2
APPLICATION NO. : 13/756436
DATED : August 5, 2014
INVENTOR(S) : Jonas Kolba Nicholson et al.

It is certified that error appears in the above-identified patent and that said Letters Patent is hereby corrected as shown below:

On The Title Page, Item (73):
"Tweddle Group, Inc., Clinton Township, MI (US)" should read, --Nuance Communications, Inc., Burlington, MA (US)--.

Signed and Sealed this
Twenty-seventh Day of October, 2015

Michelle K. Lee
*Director of the United States Patent and Trademark Office*